United States Patent
Ogawara

(10) Patent No.: US 10,882,182 B2
(45) Date of Patent: Jan. 5, 2021

(54) ROBOT APPARATUS, CONTROL METHOD OF ROBOT APPARATUS, AND RECORDING MEDIUM

(71) Applicant: CANON KABUSHIKI KAISHA, Tokyo (JP)

(72) Inventor: Takayuki Ogawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 15/460,781

(22) Filed: Mar. 16, 2017

(65) Prior Publication Data
US 2017/0266811 A1    Sep. 21, 2017

(30) Foreign Application Priority Data
Mar. 18, 2016  (JP) .................. 2016-054707

(51) Int. Cl.
*B25J 9/16* (2006.01)
*B25J 13/08* (2006.01)

(52) U.S. Cl.
CPC ............ *B25J 9/1633* (2013.01); *B25J 13/085* (2013.01); *G05B 2219/39319* (2013.01); *G05B 2219/45064* (2013.01); *Y10S 901/46* (2013.01)

(58) Field of Classification Search
CPC .................. B25J 13/085; B25J 9/1633; G05B 2219/45064; G05B 2219/39319; Y10S 901/46
See application file for complete search history.

(56) References Cited

U.S. PATENT DOCUMENTS

| | | | | |
|---|---|---|---|---|
| 6,725,734 B1* | 4/2004 | Toratani | ................... | B62D 6/10 73/862 |
| 2012/0296472 A1* | 11/2012 | Nagai | ................... | B25J 13/085 700/258 |
| 2013/0116827 A1* | 5/2013 | Inazumi | ................. | B25J 9/1694 700/260 |
| 2015/0258690 A1* | 9/2015 | Naitou | ................... | G01L 5/226 700/253 |

FOREIGN PATENT DOCUMENTS

| JP | 2012-218104 A | 11/2012 |
|---|---|---|
| JP | 2015171747 A | 10/2015 |

* cited by examiner

*Primary Examiner* — Stephen Holwerda
(74) *Attorney, Agent, or Firm* — Canon U.S.A., Inc., IP Division

(57) ABSTRACT

A robot arm includes a plurality of links and rotary joints for connecting the links with each other. A cable (wire rod) for communicating a drive signal to a drive actuator of each rotary joint is provided along each link. A reaction force table storing a reaction force value generated by the wire rod when the joint is driven in a divided storage area divided for each dynamic drive control condition is provided in a control system. In a case where each rotary joint is driven, the control device controls each rotary joint on the basis of a reaction force value obtained by referring to the reaction force table in accordance with the drive control condition.

11 Claims, 11 Drawing Sheets

ROBOT APPARATUS, CONTROL METHOD OF ROBOT APPARATUS, AND RECORDING MEDIUM

BACKGROUND

Field of the Disclosure

The present disclosure relates to a robot apparatus in which a wire rod for communicating drive signals or control signals to parts of a robot arm is provided along a plurality of links constituting the robot arm, relates to a control method thereof, and relates to a recording medium.

Description of the Related Art

In recent years, as a robot apparatus such as a multi-axis articulated robot having joints whose rotation is restricted, an articulated robot in which a torque sensor for measuring a torque that a drive actuator applies to a link is provided in a joint to perform torque (force) control of a torque generated in the joint has drawn attention. Because the torque sensor is provided in the joint, it is easy to control force generated in the joint of the articulated robot and control a load or force that an end effector provided at a tip end of the robot arm applies to a component.

At present, a robot apparatus including a torque sensor and capable of performing torque control is frequently used in assembly in which a load of several hundred grams to several kilograms is applied to a component, such as assembly of an engine component of an automobile. Meanwhile, the robot apparatus is not frequently used in assembly of a smaller load in which a load applied to a component at the time of assembly is approximately several grams, such as operation of a minute component, a film, or a sheet having a weight of several grams. A reason for this is that precision of force (torque) control of a current articulated robot is not so high and does not achieve required precision needed to perform assembly in which a range of a load applied to a component by an end effector provided at a tip end of a robot arm is approximately several grams.

For example, the robot apparatus needs a communication member for communicating, to each part of the robot arm, e.g., an actuator for driving a joint, drive signals for controlling the actuator. Those drive signals encompass not only electric signals belonging to a category of control information such as control signals but also signals belonging to a category of drive energy such as drive voltage of the actuator and pressure signals of a hydraulic pressure and an atmospheric pressure. In this specification, the above signals such as an electric signal and a pressure signal for communicating control information and drive energy, i.e., signals for controlling the actuator of each part of the robot arm are referred to as "drive signals".

For example, in a robot including a rotary drive actuator such as a motor as a drive actuator (actuator) for driving a joint or an end effector, a wire rod such as an electrical wire (cable) is used as a communication member for communicating control signals or drive power to this motor or a drive circuit thereof. Further, in a case where an actuator using a hydraulic pressure, an atmospheric pressure, or the like is used to drive the joint or the end effector, the wire rod such as a pressure pipe made of a flexible material such as rubber is used in some cases as the communication member in order to communicate a drive signal (energy).

Further, the wire rod such as the above cable or pressure pipe is provided in many cases in the form of, for example, a harness structure in which wire rods corresponding to a plurality of joints of the robot arm are bound, as compared with a case where a single wire rod is provided. In some cases, such a harness houses an encoder for detecting operation of the actuator for driving a joint and a wire rod for feeding back a signal of the above torque sensor to a control system. Further, in some cases, a holding device such as a hand or a gripper is attached to the tip end of the robot arm as the end effector (or tool). It is necessary to input/output (communicate) the above drive signal also to the end effector (tool), and, in that case, the above harness of the wire rods houses a wire rod for inputting/outputting a drive signal to the end effector (or tool) in some cases.

The above wire rod (or the harness thereof) is provided inside or outside the robot arm, and, in that case, the wire rod is placed to extend across the joints of the robot apparatus. Therefore, the wire rod for communicating a drive signal is deformed at the time of rotation operation (the same applies to translation operation) of a joint of the robot apparatus and generates reaction force based on deformation thereof.

Meanwhile, in a case where torque (force) control is performed by providing a torque (force) sensor in a joint that supports a link (or end effector unit) as described above, it is essentially desirable to measure only a torque generated in the joint with the use of the torque sensor and feedback the torque to a torque control system. However, reaction force generated due to deformation of the wire rod for communicating a drive signal to the above joint (or end effector), the deformation being caused by operation of the robot apparatus, influences a measurement value of the torque sensor provided in the joint as a measurement error.

For example, reaction force generated when the harness of the wire rods such as various cables or pressure pipes is deformed varies depending on a configuration, a scale, or the like of the robot apparatus but reaches several hundred grams in some cases. Therefore, in a case where force (or torque) control is performed at the precision of several grams, such reaction force is extremely large disturbance and influences precision of control.

In view of the above problems, there is proposed a configuration that estimates force generated in a joint on the basis of a joint torque generated when the robot apparatus performs predetermined operation(s) and a table storing an elastic relationship between an angle of rotation of the joint measured in advance and cable reaction force (Japanese Patent Laid-Open No. 2012-218104 cited below). An object of Japanese Patent Laid-Open No. 2012-218104 is to improve force controllability at the time of control of each joint. Note that, in Japanese Patent Laid-Open No. 2012-218104, the joint torque is estimated by performing reverse kinematic operation on the basis of a weight and a position of a center of gravity of each link.

However, Japanese Patent Laid-Open No. 2012-218104 cited above cannot accurately estimate a torque generated in a joint of a robot apparatus because of the following two problems. The first problem is that, in Japanese Patent Laid-Open No. 2012-218104, an estimation error is generated because the torque generated in the joint is calculated by reverse kinematic operation based on a structure condition such as geometry of the robot or a weight of each part thereof. In a case where a position of a center of gravity and a value of the weight used in the reverse kinematic operation are different from those of an actual robot apparatus, an estimation error is naturally generated. For example, in a case where a moment generated in an arbitrary joint is calculated, a torque error of 50 mNm is generated when a weight of the target is 5 kg and a position of a center of gravity thereof is shifted by 1 mm. Meanwhile, in a case where force of 1 g is controlled at a tip end of a link having 300 mm, it is necessary to control a torque of 3 mNm (300 mm×1 g) in a joint at a root of the link, and an error is more than ten times as much as a control amount and therefore there is a possibility that required precision of assembly cannot be satisfied. Further, in an actual robot arm, wire rods are not necessarily provided in a state equal to an advance measurement state. Because of this placement precision problem, in the technique of Japanese Patent Laid-Open No. 2012-218104 using force (torque) estimation calculation, the same reaction force is not necessarily generated actually even in a case where the same joint operation as joint operation in advance measurement is performed.

The second problem is that the table for use in estimation calculation in Japanese Patent Laid-Open No. 2012-218104 is configured only by a static elastic relationship between a joint angle and reaction force of a cable. An actual wire rod (cable) is made of a conducting wire, a covering material thereof, a binding material, and the like. Reaction force generated in a case where such a wire rod (cable) is actually deformed is in fact influenced by dynamic control conditions such as a deformation speed and a deformation direction. For example, the reaction force of the wire rod (cable) is supposed to show a viscous change based on the deformation speed determined on the basis of an operation speed of the joint of the robot arm and show a non-linear (hysteresis) change depending on the deformation direction. Such a viscous change in the cable reaction force related to the deformation speed and such a non-linear (hysteresis) change generated when the cable is deformed/deformation thereof is restored are not considered in Japanese Patent Laid-Open No. 2012-218104, and therefore it is impossible to precisely predict the reaction force of the cable.

Therefore, in the technique of Japanese Patent Laid-Open No. 2012-218104, there is a possibility that, although control is performed in consideration of the reaction force of the wire rod, force (torque) control cannot be performed with satisfactory precision. In conveyance of an article or assembly of an article having a weight of several kilograms, reduction in the above minute force controllability is not problematic. However, in a case where a component having a minute weight of several grams is assembled by force control, it is impossible to ignore reduction in the force controllability caused by reaction force of the cable. The technique in Japanese Patent Laid-Open No. 2012-218104 may be practically used in a case where a range of a load treated by a robot is large. However, in particular, in force (torque) control of order of several grams as described above, satisfactory precision cannot be achieved even by the technique in Japanese Patent Laid-Open No. 2012-218104, and the force controllability may be reduced.

The above problems are reasons why a general articulated robot apparatus has not been conventionally used willingly for assembling a minute load. Therefore, an apparatus having a special structure and manufactured as a dedicated apparatus while a dimension and a precision range are being satisfactorily controlled has been conventionally used for assembling an article having a minute weight of several grams, instead of a robot apparatus.

Meanwhile, it is also expected that manufacturing of many industrial products will be changed into high-mix low-volume production in the future. In addition, a circumstance in which the above dedicated apparatus is individually necessary for each minute (tiny) component can be a serious bottleneck in realization of high-mix low-volume production. In a case where it is necessary to design and produce the above dedicated apparatus for each of a large number of minute (tiny) components necessary for high-mix low-volume production, there may arise problems such as an increase in a startup period of a production line and a rise in a startup cost because of this.

SUMMARY

In view of this, an object of the present disclosure is to perform, in a general articulated robot apparatus, satisfactorily precise force (torque) control in which reaction force of a wire rod is considered and perform efficient high-mix low-volume production in a short period without using a dedicated apparatus.

In other words, an object of the present disclosure is to improve measurement or estimation precision of a torque generated in a joint due to reaction force of a wire rod used for communicating a drive signal of the joint (or end effector) of a robot apparatus in consideration of a dynamic control condition, thereby realizing precise robot control.

In order to solve the above problems, the present disclosure employs a robot apparatus or a control method thereof, the robot apparatus including a plurality of links constituting a robot arm, a joint connecting the links with each other, a drive actuator configured to drive the joint, a wire rod provided along the links and configured to communicate a drive signal to the drive actuator, and a control device configured to control the drive actuator, includes a table memory storing a reaction force value generated by the wire rod when the joint is driven, wherein, in a case where the drive actuator of the joint is driven, the control device executes robot control to control the drive actuator on the basis of the reaction force value obtained by referring to the table memory in accordance with the drive control condition.

According to the above configuration, there is used the table memory in which the reaction force value generated by the wire rod is stored in the divided storage area divided for each of the dynamic drive control conditions such as a driving speed and an operation direction of the joint. Therefore, it is possible to acquire (estimate) a more accurate reaction force value of the wire rod in which the dynamic drive control conditions such as a driving speed and an operation direction of the joint are reflected. When the reaction force value of the wire rod acquired from the table memory is used in force control of each joint of the robot arm, it is possible to greatly improve precision of the force control of the robot arm. Therefore, also in, for example, a robot apparatus having a general configuration, it is possible to accurately perform force control of joints, and thus it is possible to realize assembly of a component having a small weight of approximately several grams which needs delicate force control. With this, in a production line in which a component having a minute weight is assembled, a dedicated apparatus, manual operation by human power, or the like is unnecessary and a robot apparatus having a general configuration can be used. Therefore, it is possible to cut designing, a production cost, and a production period of a dedicated apparatus that has been conventionally necessary. Further, it is possible to reduce a startup cost of the production line in which a tiny component is assembled.

Further features of the present disclosure will become apparent from the following description of exemplary embodiments (with reference to the attached drawings).

BRIEF DESCRIPTION OF THE DRAWINGS

FIG. 1A is an explanatory diagram showing the same apparatus seen from a side thereof and FIG. 1B is an explanatory diagram showing the same apparatus seen from a back side thereof.

FIG. 10A is a flowchart showing a method of preparing an angle table in each of normal and reverse driving directions and FIG. 10B is a flowchart showing a method of preparing a speed table in each of the normal and reverse driving directions.

DESCRIPTION OF THE EMBODIMENTS

Hereinafter, an embodiment for implementing the present disclosure will be described with reference to examples shown in the attached drawings. Note that examples described below are merely examples, and, for example, a detailed configuration can be changed as appropriate by a person skilled in the art within the scope of the present disclosure. Further, numerical values cited in this embodiment are reference numerical values and do not limit the present disclosure.

EXAMPLE 1

(Basic Configuration of Robot Apparatus)

Figure 1A:
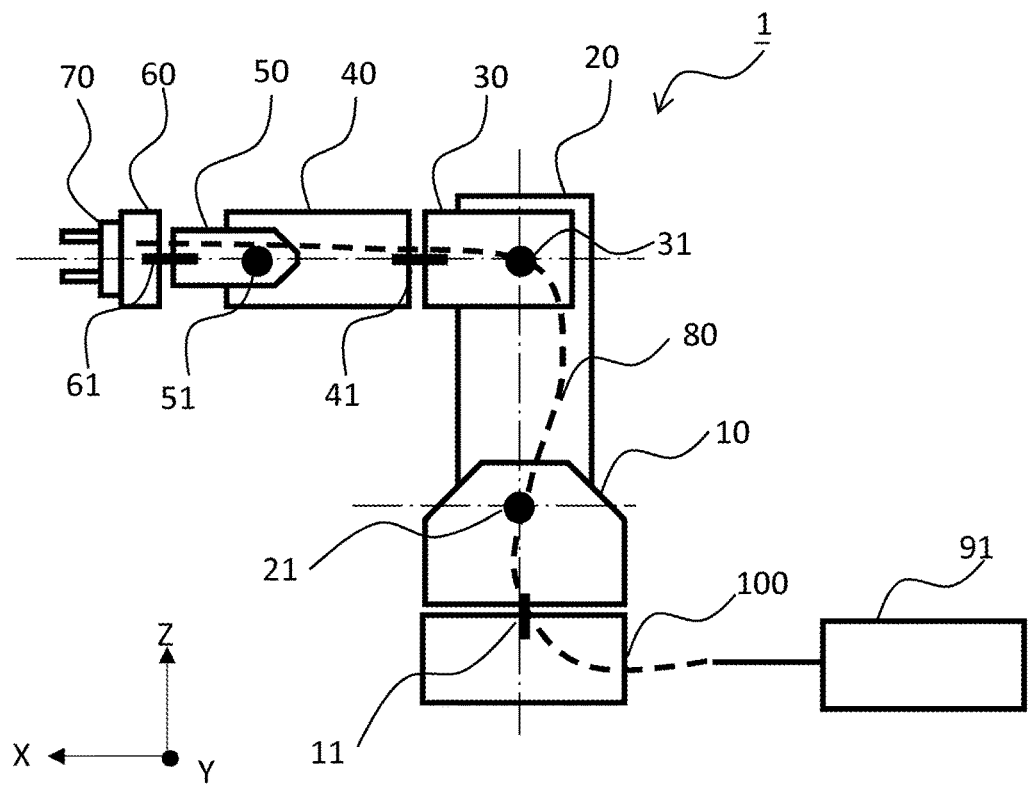
FIGS. 1A and 1B show a robot apparatus in Example 1.
Figure 1B:
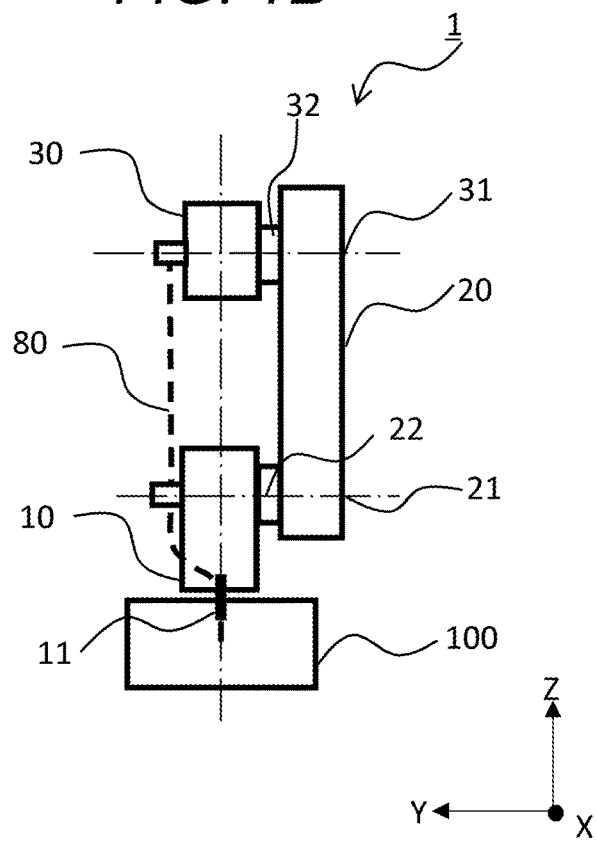

FIGS. 1A and 1B show the whole configuration of an articulated robot apparatus as an example of a robot apparatus in which the present disclosure is employed. FIG. 1A shows the robot apparatus in this example seen from, for example, a side thereof. Axes of coordinates of a three-dimensional (XYZ) coordinate system used for controlling this robot apparatus are shown in a lower left part of FIG. 1A. As shown in FIG. 1A, among those axes of coordinates, the Z-axis is directed to an upper side of the drawing and the X-axis is directed to a left side of the drawing. FIG. 1B shows a robot arm 1 of the same robot apparatus seen from, for example, a back side thereof (right side in FIG. 1A). Axes of coordinates of a similar three-dimensional (XYZ) coordinate system are also shown in a lower right part of FIG. 1B. For example, a posture of the robot arm 1 shown in FIG. 1A is set as an initial posture.

Figure 3:
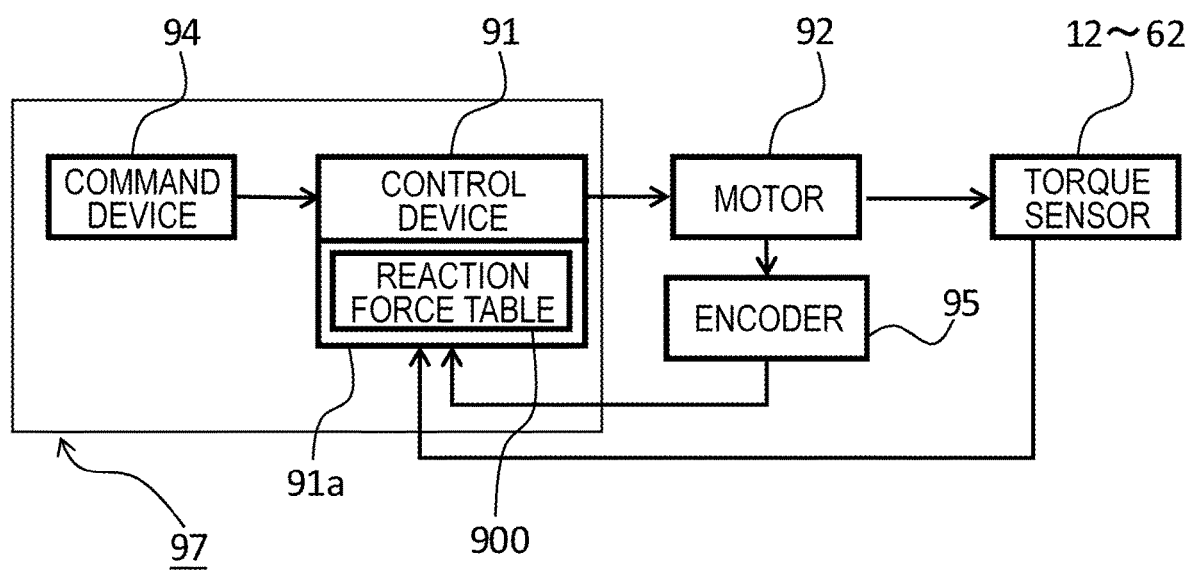
FIG. 3 is a block diagram showing a configuration of a control system of the robot apparatus in Example 1.

As shown in FIG. 1A, the robot apparatus includes the robot arm 1 (robot main body) and a control device 91 for controlling the robot arm 1. More specifically, as illustrated in FIG. 3, the control device 91 is connected to a command device 94, and the control device 91 and the command device 94 constitute a control system 97 of the robot arm 1 (robot main body). The command device 94 is, for example, a teaching device such as a teaching pendant. Furthermore, the control device 91 includes a reaction force table storage unit storing a reaction force table 900 described below.

In the command device 94, for example, an operation unit including an operation key for moving, for example, a posture (position and angle) of a joint of the robot arm 1 or a reference position located at a tip end or the like of the robot arm 1 is provided. When some robot operation is performed in the operation unit of the command device 94, the control device 91 controls operation of the robot arm 1 through operation via a cable 80 (wire rod) in response to the operation in the command device 94. In that case, each part of the robot arm 1 is controlled by the control device 91 executing a robot control program including a control program described below.

The robot arm 1 shown in FIGS. 1A and 1B is a robot arm having a configuration in which a plurality of links are connected to one another via a plurality of joints (six axes) by, for example, a serial link method. An end effector 70 is connected to a link 60 at the tip end of the robot arm 1. Links 10, 20, 30, 40, 50, and 60 of the robot arm 1 are connected to one another as described below via, for example, joints, i.e., rotary joints 11, 21, 31, 41, 51, and 61 in this example.

A base 100 (base portion) of the robot arm 1 and the link 10 are connected via the rotary joint 11 that rotates around a rotation axis in a Z-axis direction. The rotary joint 11 has a movable range of, for example, approximately ±180 degrees from the initial posture. The link 10 and the link 20 of the robot arm 1 are connected via the rotary joint 21. A rotation axis of the rotary joint 21 is matched with a Y-axis direction in a state of FIGS. 1A and 1B. The rotary joint 21 has a movable range of, for example, approximately ±80 degrees from the initial posture.

The link 20 and the link 30 of the robot arm 1 are connected via the rotary joint 31. A rotation axis of the rotary joint 31 is matched with the Y-axis direction in the state of FIGS. 1A and 1B. The rotary joint 31 has a movable range of, for example, approximately ±70 degrees from the initial posture. The link 30 and the link 40 of the robot arm 1 are connected via the rotary joint 41. A rotation axis of the rotary joint 41 is matched with an X-axis direction in the state of FIGS. 1A and 1B. The rotary joint 41 has a movable range of, for example, approximately ±180 degrees from the initial posture.

The link 40 and the link 50 of the robot arm 1 are connected via the rotary joint 51. A rotation axis of the rotary joint 51 is matched with the Y-axis direction in the state of FIGS. 1A and 1B. The rotary joint 51 has a movable range of, for example, approximately ±120 degrees from the initial posture. The link 50 and the link 60 of the robot arm 1 are connected via the rotary joint 61. A rotation axis of the rotary joint 61 is matched with the X-axis direction in the state of FIGS. 1A and 1B. The rotary joint 61 has a movable range of, for example, approximately ±240 degrees from the initial posture.

As described above, in this example, the rotation axes of the rotary joints 11, 41, and 61 are provided in parallel (or coaxially) with a central axis (alternate long and short dash line) of two links joined by each rotary joint and are provided to change a (relative) angle between the two links around the rotation axis. Meanwhile, the rotation axes of the rotary joints 21, 31, and 51 are provided to change a (relative) angle at which central axes (alternate long and short dash lines) of two links joined by each rotary joint intersect.

Further, the end effector 70 for performing assembly work or moving work in a production line, such as an (electric) hand or an air hand (driven by an atmospheric pressure), is connected to a tip end of the link 60 of the robot arm 1. The end effector 70 can be attached to the link 60 by (semi-) fixing means (not shown) such as screwing or can be attached thereto by attaching/detaching means (not shown) such as latch (ratchet) fastening. In particular, in a case where the end effector 70 is detachable, it is also considered that the robot arm 1 is controlled to detach or replace the end effector placed at a supply position (not shown) through operation of the robot itself.

(Cable Path)

The rotary joints 11 to 61 or the end effector 70 of the robot arm 1 in FIGS. 1A and 1B are/is driven by, for example, an electric rotary drive actuator such as a motor (92 described below: FIG. 3). In that case, in each rotary joint, not only the motor but also a reduction gear having a wave gear mechanism or the like is used in some cases. Further, a conversion mechanism in a speed reduction or driving direction, such as rack and pinion, is used in the end effector such as a hand or a gripper in some cases. The motors for driving the rotary joints 11 to 61 (or the end effector 70) are provided at predetermined positions inside the respective rotary joints (or the end effector 70). Note that, although those motors are provided inside the joints in this example, the motors (or reduction gears) may be provided outside the joints.

In a case where driving means of the rotary joints 11 to 61 is motors as described above, wire rods such as cables or wires are necessary as communicating means for communicating energy (drive power) or control signals for driving the motors, i.e., drive signals. Such wire rods are provided in the form of a wire harness in which a plurality of wire rods are bound or in the form of a multi-cable in which a plurality of wire rods are included in a single cover.

Further, it is also considered that the driving means of the rotary joints 11 to 61 and the end effector 70 has a pressure mechanism using a hydraulic (fluid) pressure or an atmospheric pressure. In that case, it is necessary to communicate drive energy configured by pressure signals or control signals (drive signals) to the parts of the robot arm 1, i.e., the rotary joints 11 to 61 and the end effector 70. In this case, a wire rod such as a flexible pressure tube is preferably used as the communicating means for communicating drive energy or control signals.

In this example, in order to simplify description, the driving means of the rotary joints 11 to 61 (and the end effector 70) is motors and therefore the wire rod serving as the communicating means for communicating drive energy or control signals to those parts is the (electric) cable 80. Further, the cable 80 is made up of, for example, a plurality of wire rods connecting the control device 91 and the rotary joints (or the end effector 70) and has, for example, a wire harness (bundled wire) configuration.

A wiring (arrangement) path of the cable 80 is indicated by a broken line in FIGS. 1A and 1B. The cable (or a harness thereof) in the base 100 and the links 10 to 60 is provided inside/outside the arm and is fixed (or semi-fixed) at an arbitrary position so as not to interrupt operation of the robot arm 1 or interfere with a peripheral apparatus.

(Fixation of Cable to Link)

Figure 4:
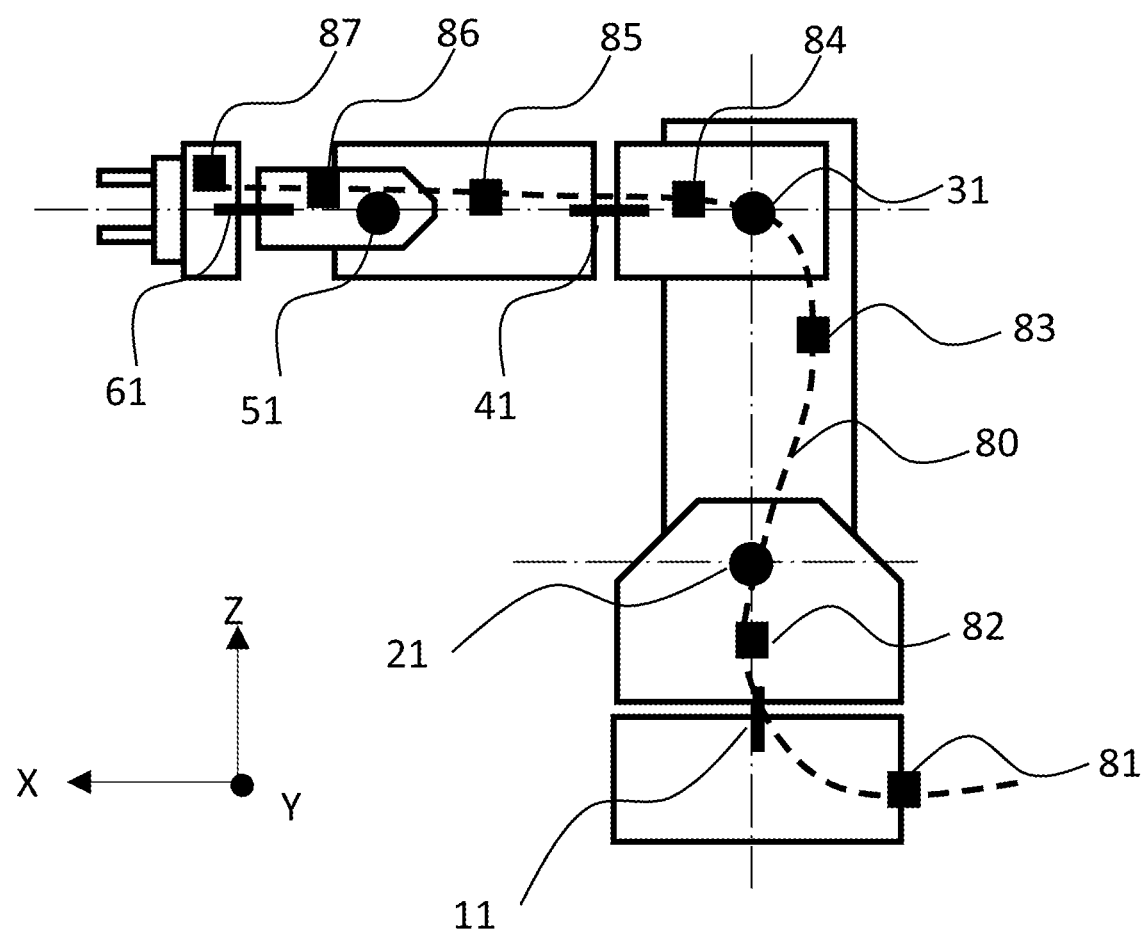
FIG. 4 shows fixed portions of a cable in the robot apparatus in Example 1.

FIG. 4 shows fixed portions of the cable. As a fixed position of the cable, for example, the cable is preferably fixed at at least one position before/after each rotary joint in order to prevent cable reaction force generated in a target rotary joint from receiving influence of operation of another rotary joint. In a case of, for example, the rotary joint 21, the cable 80 is fixed at a cable fixing portion 82 between the rotary joint 11 and the rotary joint 21. Furthermore, the cable 80 is fixed at a cable fixing portion 83 between the rotary joint 21 and the rotary joint 31. With this, reaction force that the cable 80 applies to the rotary joint 21 depends on operation of the rotary joint 21 regardless of operation of another rotary joint. Regarding the rotary joints 11, 31, 41, 51, and 61, cable fixing portions 81, 84, 85, 86, 87 are similarly placed to fix the cable.

Note that, in a case where the cable 80 is not fixed before/after each rotary joint, operation of the plurality of joints influences an increase/decrease in cable reaction force. In this case, a cable reaction force table described below needs to be configured as a table in which operation of the plurality of joints influencing upon each other is reflected. In that case, a cable reaction force table for a specified joint needs to store data at different angles (postures) of other joints, and therefore a scale of the table is increased. In a case where a reaction force value of the cable at a specified angle of a specified joint is stored in, for example, an angle table described below, the reaction force value is stored for each of the different angles (postures) of the other joints. Therefore, the scale of the table is increased, and preparation thereof may be difficult. On the contrary, according to a structure in which influence of other joints upon cable reaction force is reduced (or removed) by using the cable fixing portions 81, 82, . . . as described above, the number of records in the cable reaction force table can be reduced, and a computational resource for preparation thereof can be small. Hereinafter, description will be made on the premise that the cable fixing portions 81, 82, . . . are used so that cable reaction force related to a specified joint is not influenced by angles (postures) of other joints.

(Cable Reaction Force Table)

Figure 2:
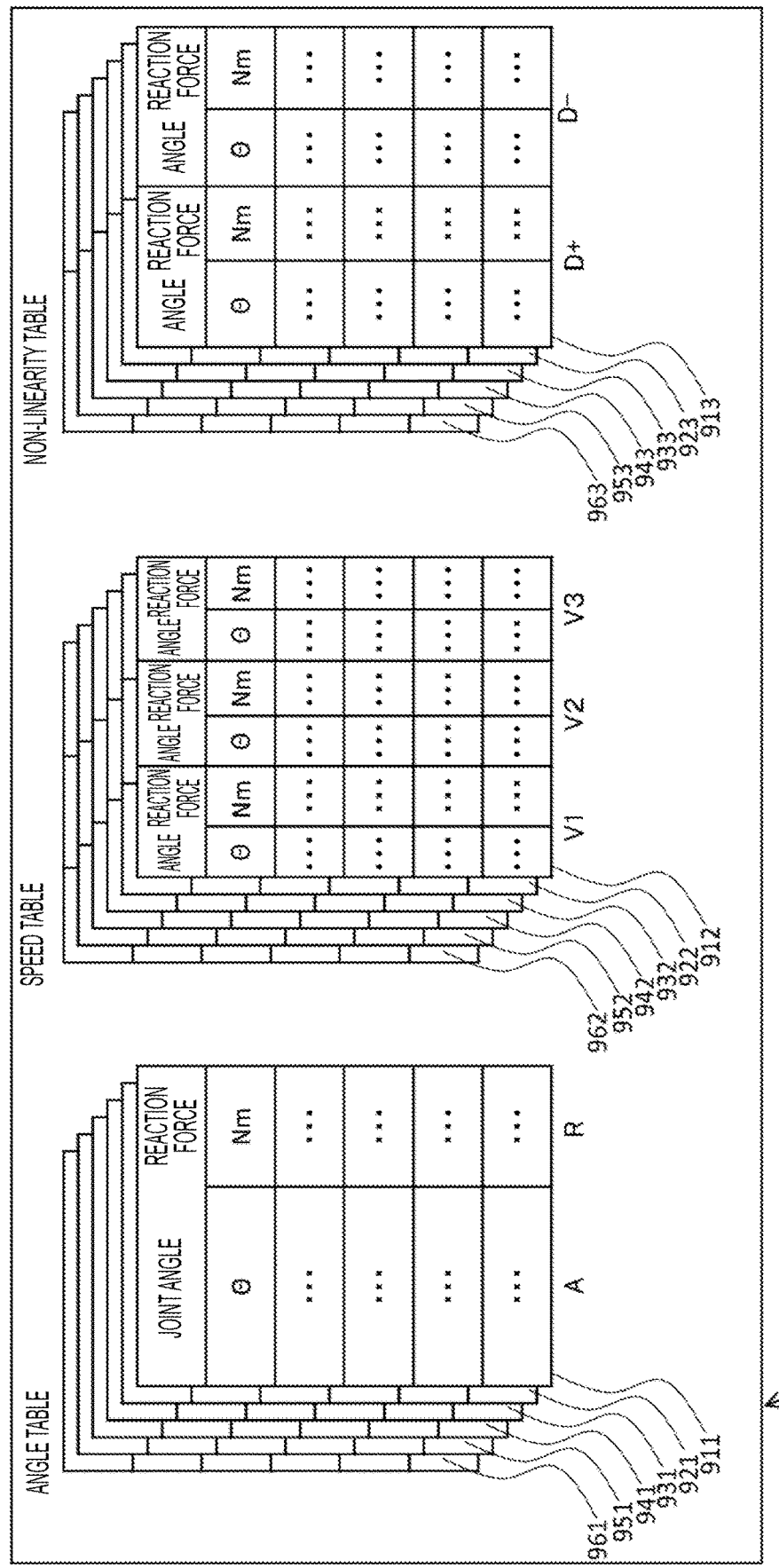
FIG. 2 is a table showing a relationship between movement of a rotary joint and cable reaction force in the robot apparatus in Example 1.
Figure 7:
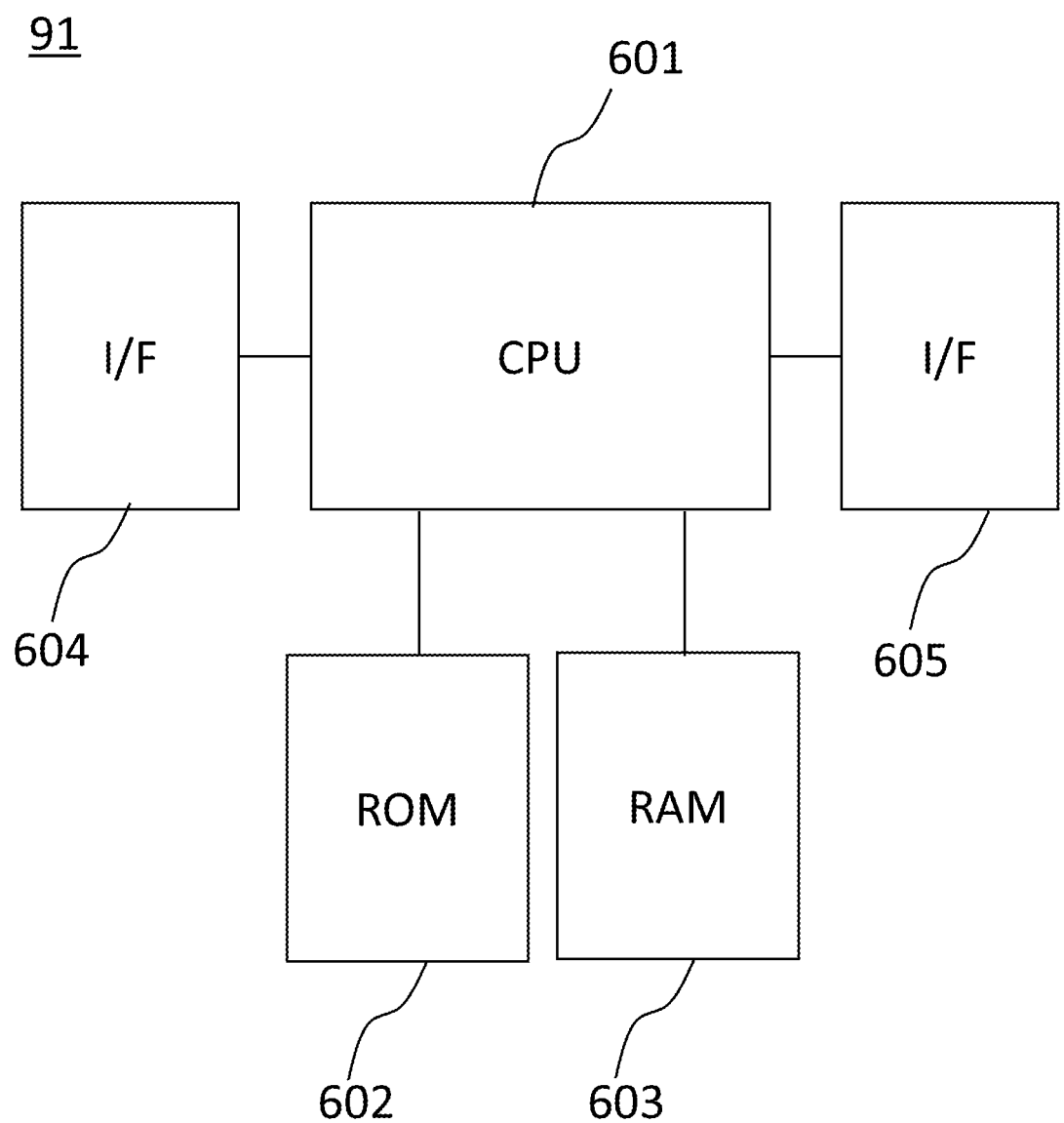
FIG. 7 is a block diagram showing a configuration example of a control device of the robot apparatus in Example 1.

FIG. 2 shows a configuration example of the reaction force table 900 storing reaction force values generated by the cable when the rotary joints 11, 21, . . . are rotated. The reaction force table 900 can be stored on a memory 91a (FIG. 3) of the control device 91. The memory 91a can be actually configured by a ROM 602 and a RAM 603 (FIG. 7 described below).

In FIG. 2, the reaction force table 900 includes angle tables 911, 921, 931, 941, 951, and 961, speed tables 912, 922, 932, 942, 952, and 962, and non-linearity tables 913, 923, 933, 943, 953, and 963. Each of the angle, speed, non-linearity tables stores a relationship between movement of each of the rotary joints 11, 21, 31, 41, 51, and 61 and cable reaction force generated in that case while associating the relationship.

In particular, two tables shown on a right side in the reaction force table 900, i.e., the speed tables 912 to 962 and the non-linearity tables 913 to 963 are characteristic configurations of this embodiment. Those speed tables 912 to 962 and the non-linearity tables 913 to 963 are table memories that store reaction force values generated by the wire rods (cable 80) when the rotary joints 11 to 61 are driven in divided storage areas divided for each dynamic drive control condition.

Meanwhile, the angle tables 911 to 961 are table memories that store a (static) elastic relationship of reaction force R generated by the wire rods (cable 80) when the rotary joints 11 to 61 are controlled at a specified joint angle A. The angle tables 911 to 961 are substantially equal to tables disclosed in Japanese Patent Laid-Open No. 2012-218104 described above. If the reaction force table 900 has a configuration in which only the angle tables 911 to 961 are arranged, this configuration is substantially equal to the configuration in Japanese Patent Laid-Open No. 2012-218104, and therefore the above object cannot be achieved. Thus, in this embodiment, at least one set of the two sets of tables on the right side in FIG. 2, i.e., the speed tables 912 to 962 or the non-linearity tables 913 to 963 is included in the reaction force table 900. Note that a control procedure for preparing the angle tables 911 to 961 corresponding to a basic table configuration will be described with reference to FIG. 8 described below.

Meanwhile, the speed tables 912 to 962 and the non-linearity tables 913 to 963 store reaction force generated by the wire rods (cable 80) in the divided storage areas divided for each dynamic drive control condition, i.e., each of the driving speeds (V1, V2, . . .) and the driving directions (D+, D−) of the joints. In this case, what is stored in each divided storage area corresponding to each dynamic drive control condition is a record in which the joint angle (A) is associated with the reaction force (R) generated by the wire rod (cable 80) at the joint angle (A), as in the angle tables 911 to 961.

For example, in the example of FIG. 2, the speed tables 912 to 962 store reaction force (Nm) generated by the wire rods (cable 80) at a specified joint angle (θ) while the rotary joints 11 to 61 are being driven at the joint driving speeds V1, V2, V3(, . . .). Note that, although three types of joint driving speeds V1, V2, and V3 are shown herein, a range of speed (variable speed) at the time of driving of the rotary joints 11 to 61 is not limited to three types, and it is also possible to arrange divided storage areas storing reaction force (Nm) at more (or less) types of speed.

V1, V2, and V3 in a lower center portion of FIG. 2 correspond to divided storage areas storing records in which joint angles (θ) and reaction force (Nm) at the joint driving speeds V1, V2, and V3 (dynamic drive control condition) which are stored in columns above V1, V2, and V3 are associated with each other. Those divided storage areas (V1 to V3, . . .) have a record configuration apparently equal to the angle tables 911 to 961, as is clear from comparison with the angle tables 911 to 961. It can be said that the speed tables 912 to 962 are table memories regarding a viscous behavior of cable reaction force. Note that, when the rotary joints 11 to 61 are driven by the motor (92: FIG. 3) or the like, the joint driving speed is expressed by using a unit such as an angular velocity (rad/sec).

Note that FIG. 2 is shown to facilitate understanding, and at which address in a storage space each divided storage area (V1 to V3, . . .) is actually arranged is arbitrary. Therefore, address arrangement of each divided storage area (V1 to V3, . . .) does not necessarily need to have an anteroposterior (vertical) relationship shown in FIG. 2 in terms of implementation. This point is also applied to the non-linearity tables 913 to 963. A control procedure for preparing the speed tables 912 to 962 will be described with reference to FIG. 9 described below.

Further, in FIG. 2, the divided storage areas of the non-linearity tables 913 to 963 store reaction force (Nm) generated by the wire rods (cable 80) at a specified joint angle (θ) while the rotary joints 11 to 61 are being driven in normal rotation (D+) and reverse rotation (D−) directions.

Figure 11:
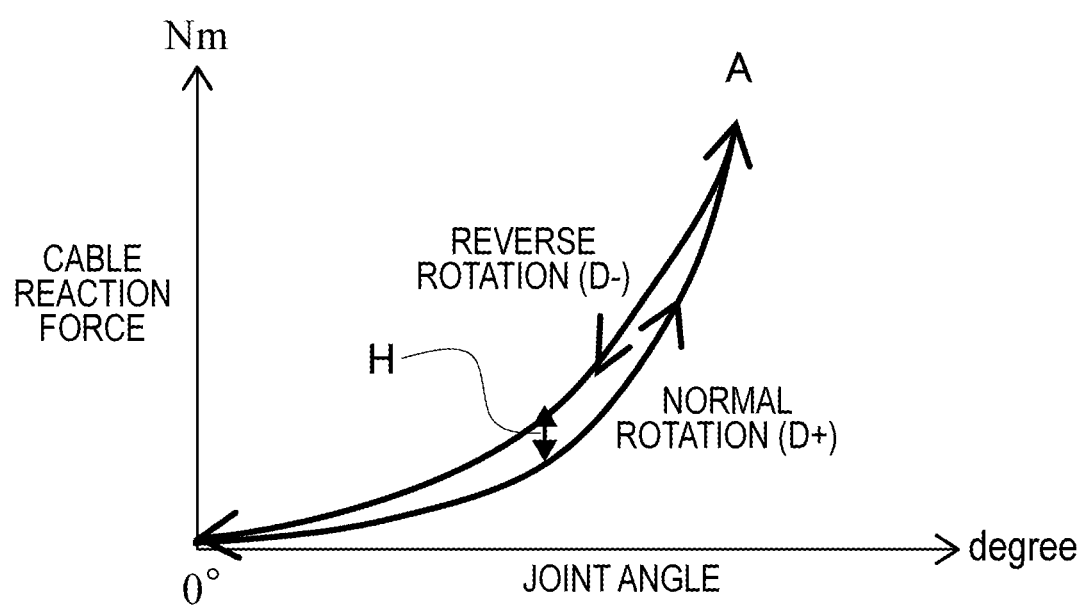
FIG. 11 is a chart showing a rotation-direction-dependent hysteresis characteristic in a relationship between a joint angle and cable reaction force in preparation of a non-linearity table.

It is known that, in a deformation phenomenon of a member of this kind such as the wire rods (cable 80), a change in reaction force generated by the member in a forward path and a return path of operation generally generates a non-linear difference between the forward path and the return path of the operation. For example, FIG. 11 shows a change in cable reaction force (Nm) between a forward path in which a certain rotary joint (11 to 61) is driven in the normal rotation (D+) direction from the joint angle 0° to A and a return path in which the certain rotary joint returns through the same path in the reverse rotation (D−) direction. Such a nonlinear characteristic that differs between the forward path and the return path of the operation is generally referred to as "hysteresis" or the like, and this hysteresis H is quantitatively written as a difference between a measurement amount in the forward path and a measurement amount in the return path in some cases. It can be said that the non-linearity tables 913 to 963 in FIG. 2 are table memories in which such a non-linear behavior of cable reaction force related to a dynamic drive control condition (driving direction) of a certain joint, i.e., a hysteresis characteristic is written.

D+ and D− in the lower right portion of FIG. 2 correspond to divided storage areas storing records in which joint angles (θ) and reaction force (Nm) in joint driving directions (dynamic drive control conditions), i.e., the normal rotation (D+) and the reverse rotation (D−) which are stored in columns above D+ and D− are associated with each other. In FIG. 2, those divided storage areas (D+, D−) have a record configuration apparently equal to the angle tables 911 to 961, as is clear from comparison with the angle tables 911 to 961.

Herein, it can be considered that the non-linearity tables 913 to 963 are two types of angle tables (911 to 961) prepared in the normal rotation (D+) and reverse rotation (D−) directions in terms of a record configuration.

When this is amplified, it is found that two types of speed tables (912 to 962) may be prepared in the normal rotation (D+) and reverse rotation (D−) directions. In addition, the two types of speed tables (912 to 962) prepared in the normal rotation (D+) and reverse rotation (D−) directions have divided storage areas divided in accordance with two dynamic drive control conditions, i.e., a driving speed and a driving direction of a joint. A scale of the tables corresponds to two sets (for normal rotation (D+) and for reverse rotation (D−)) of the speed tables (912 to 962) shown in a center portion of FIG. 2.

FIG. 2 does not explicitly show a table having the divided storage areas divided in accordance with the two dynamic drive control conditions, i.e., the driving speed and the driving direction of the joint. However, a procedure for preparing the non-linearity tables 913 to 963 as the two types of angle tables (911 to 961) will be described with reference to FIG. 10A described below. Further, a procedure for preparing the non-linearity tables 913 to 963 as the two types of speed tables (912 to 962) will be described with reference to FIG. 10B described below.

As described above, the speed tables 912 to 962 and the non-linearity tables 913 to 963 in which each dynamic drive control condition, i.e., the driving speed (V1, V2, . . .) or the driving direction (D+, D−) of the joint is reflected are prepared in a storage area such as the ROM 602 or the RAM 603.

However, in order to perform control in which each dynamic drive control condition is reflected, at least one set of tables, i.e., the speed tables 912 to 962 or the non-linearity tables 913 to 963 are prepared as the reaction force table 900. In a case of the non-linearity tables 913 to 963 in particular, any of non-linearity tables divided in accordance with only the driving direction and non-linearity tables divided in accordance with both the dynamic drive control conditions, i.e., the driving speed and the driving direction of the joint may be used. The non-linearity tables divided in accordance with only the driving direction can be prepared by, for example, the procedure in FIG. 10A. Further, the non-linearity tables divided in accordance with both the dynamic drive control conditions, i.e., the driving speed and the driving direction of the joint can be prepared by, for example, the procedure in FIG. 10B.

As described above, a table memory storing reaction force, speed, non-linearity, and the like in a divided storage area divided for each dynamic drive control condition is prepared as the reaction force table 900. With this, the control device 91 (FIG. 3: described below) can refer to the reaction force table 900 in accordance with a dynamic drive control condition of each joint and estimate a reaction force value of the wire rod (cable 80) generated in the dynamic drive control condition. In addition, it is possible to execute robot control to perform drive control of the rotary joint on the basis of the reaction force value acquired by referring to the reaction force table 900.

(Arrangement of Torque Sensor)

In this example, the reaction force table 900 for estimating reaction force generated at the time of deformation of the cable 80 can be reflected in drive control of the rotary joints 11 to 61. For example, in a case of the rotary joint 21 of the robot arm 1, a torque sensor 22 for measuring a drive torque of the motor (not shown) for driving the rotary joint 21, i.e., rotational drive force applied from the motor to the link 20 is provided (FIG. 1B). The torque sensor 22 is provided at a predetermined position on a drive shaft of a drive system provided inside the rotary joint 21, the drive system including the motor or further including the reduction gear.

Note that, although detailed structure and arrangement position of the torque sensor 22 are not shown, a publicly-known structure may be used in the torque sensor 22 for measuring rotational drive force of the rotary joint. Further, torque sensors 12, 32, 42, 52, and 62 (FIG. 3) similar to the torque sensor 22 are provided in the other rotary joints 11, 31, 41, 51, and 61, respectively.

The torque sensor 22 for measuring rotational drive force of the rotary joint 21 is provided at the predetermined position on the drive shaft of the drive system including the motor for driving the rotary joint 21 or further including the reduction gear as described above. In addition, in, for example, the structure in which the cable 80 is (semi-)fixed on the axis of the rotary joint 21 as described above, the cable 80 is deformed on both sides of the rotary joint 21 when the rotary joint 21 is driven by the motor and an angle thereof is changed. Therefore, the torque sensor 22 for measuring the rotational drive force of the rotary joint 21 actually detects a torque in which reaction force generated at the time of deformation of the cable 80 and rotational drive force of the motor driving the rotary joint 21 are combined.

Figure 5:
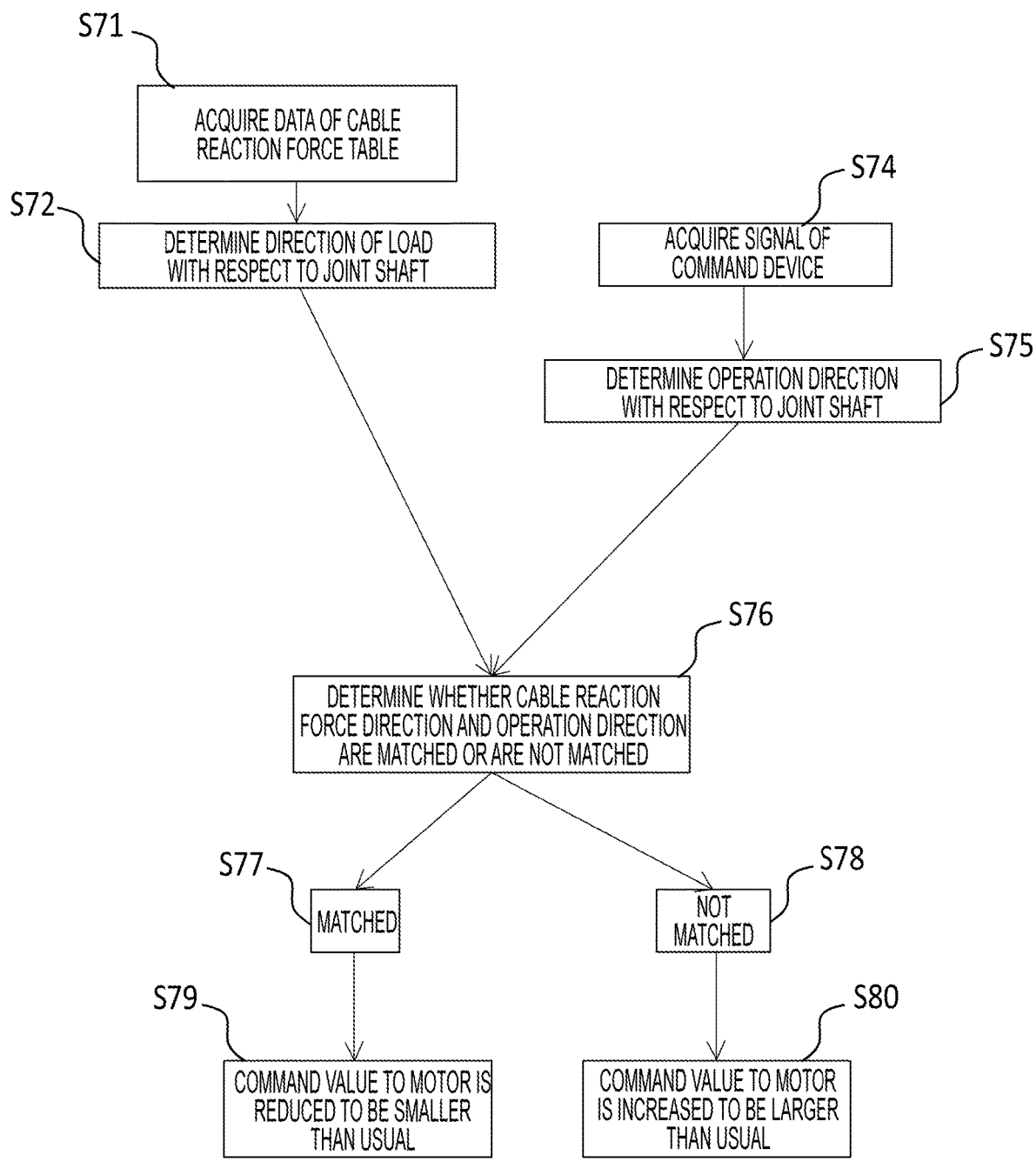
FIG. 5 is a flowchart showing robot control in the robot apparatus in Example 1.
Figure 6:
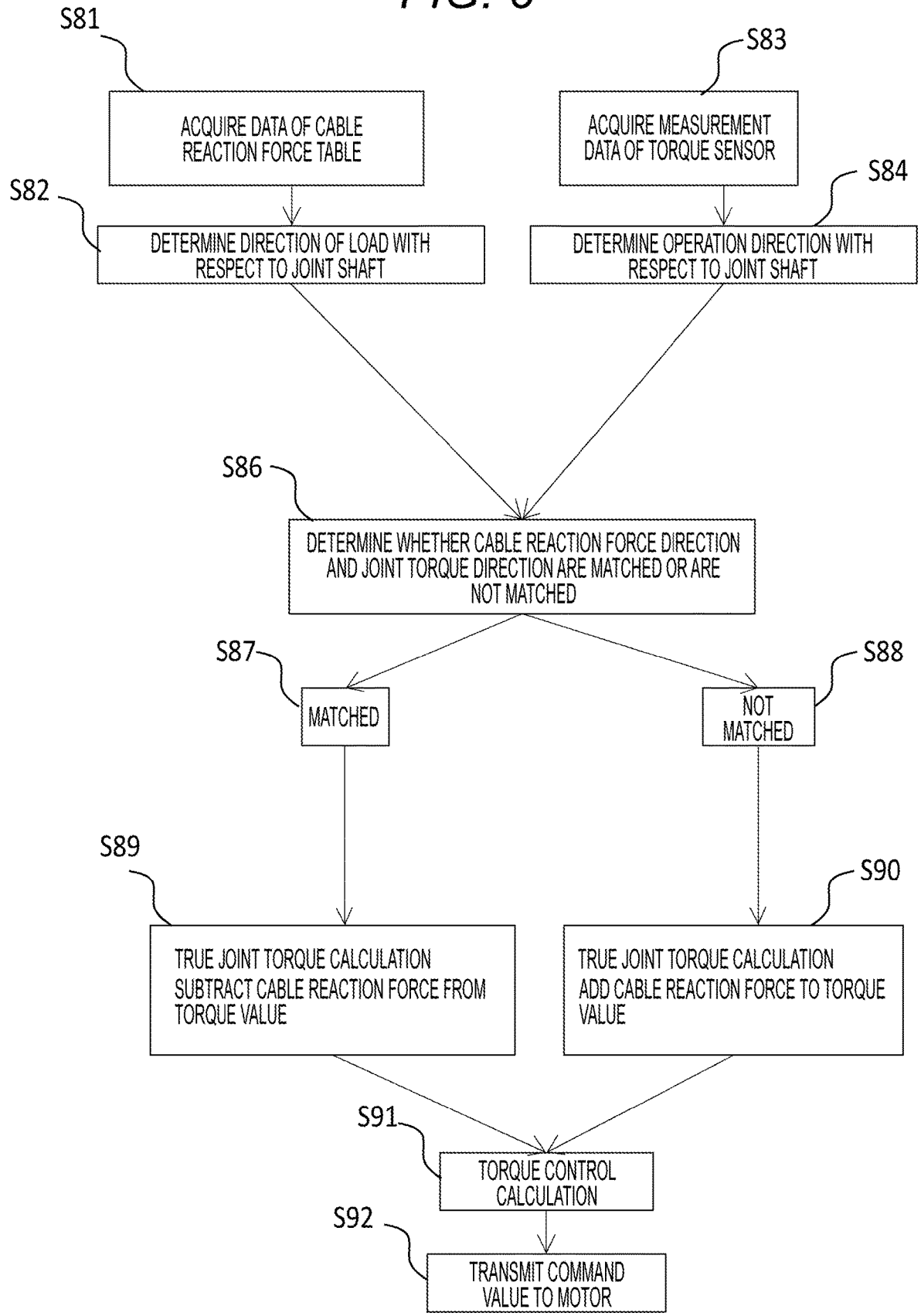
FIG. 6 is a flowchart showing different robot control in a robot apparatus in Example 2.

In view of this, regarding the rotary joint 21, the reaction force table 900 showing the reaction force generated at the time of deformation of the cable 80 is provided. By using the reaction force table 900, it is possible to correct, for example, drive control to feed back output of the torque sensor 22 to driving of the rotary joint 21 (FIG. 5 and FIG. 6 described below).

(Preparation Processing of Reaction Force Table)

Figure 8:
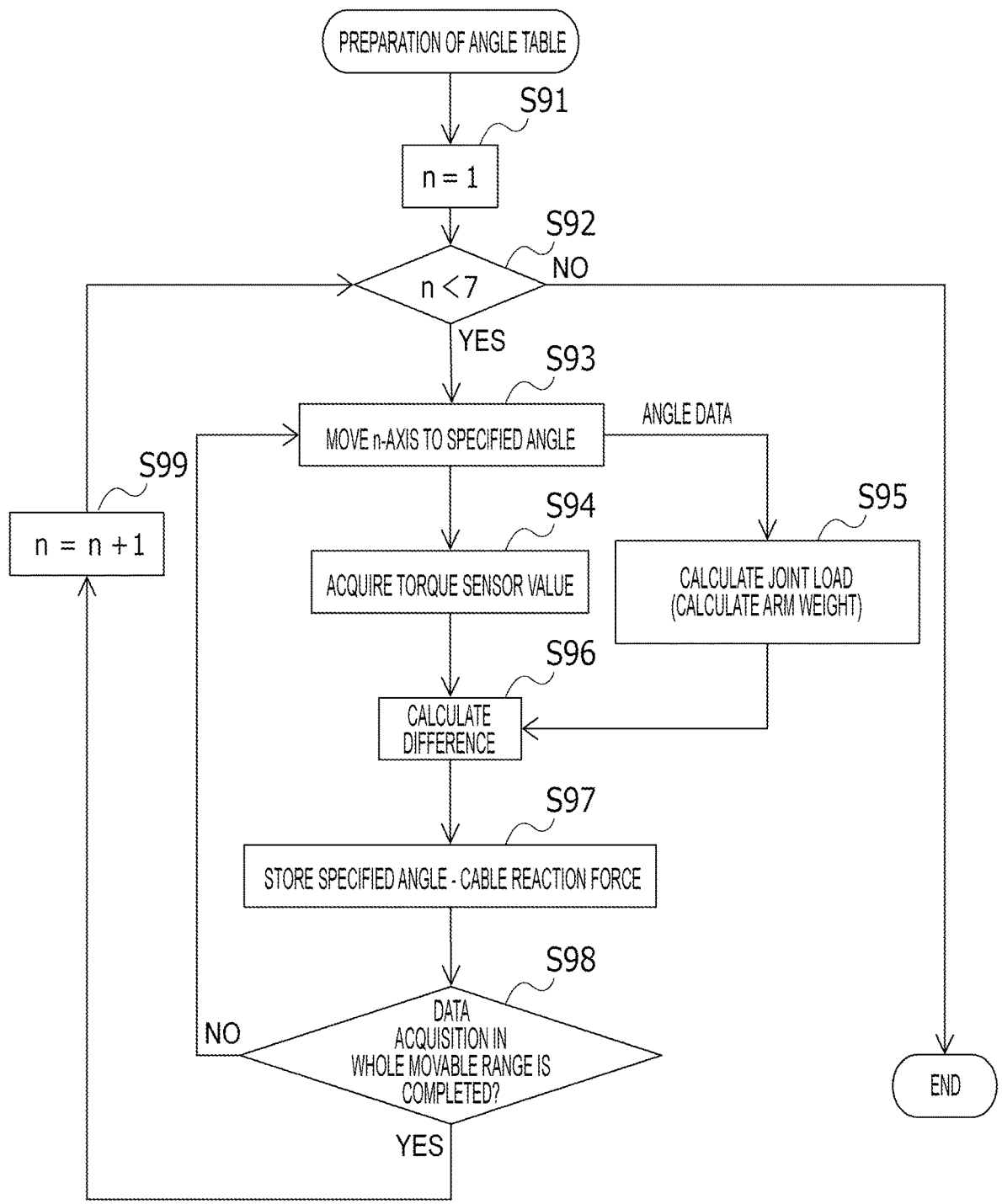
FIG. 8 is a flowchart showing preparation processing of an angle table.
Figure 9:
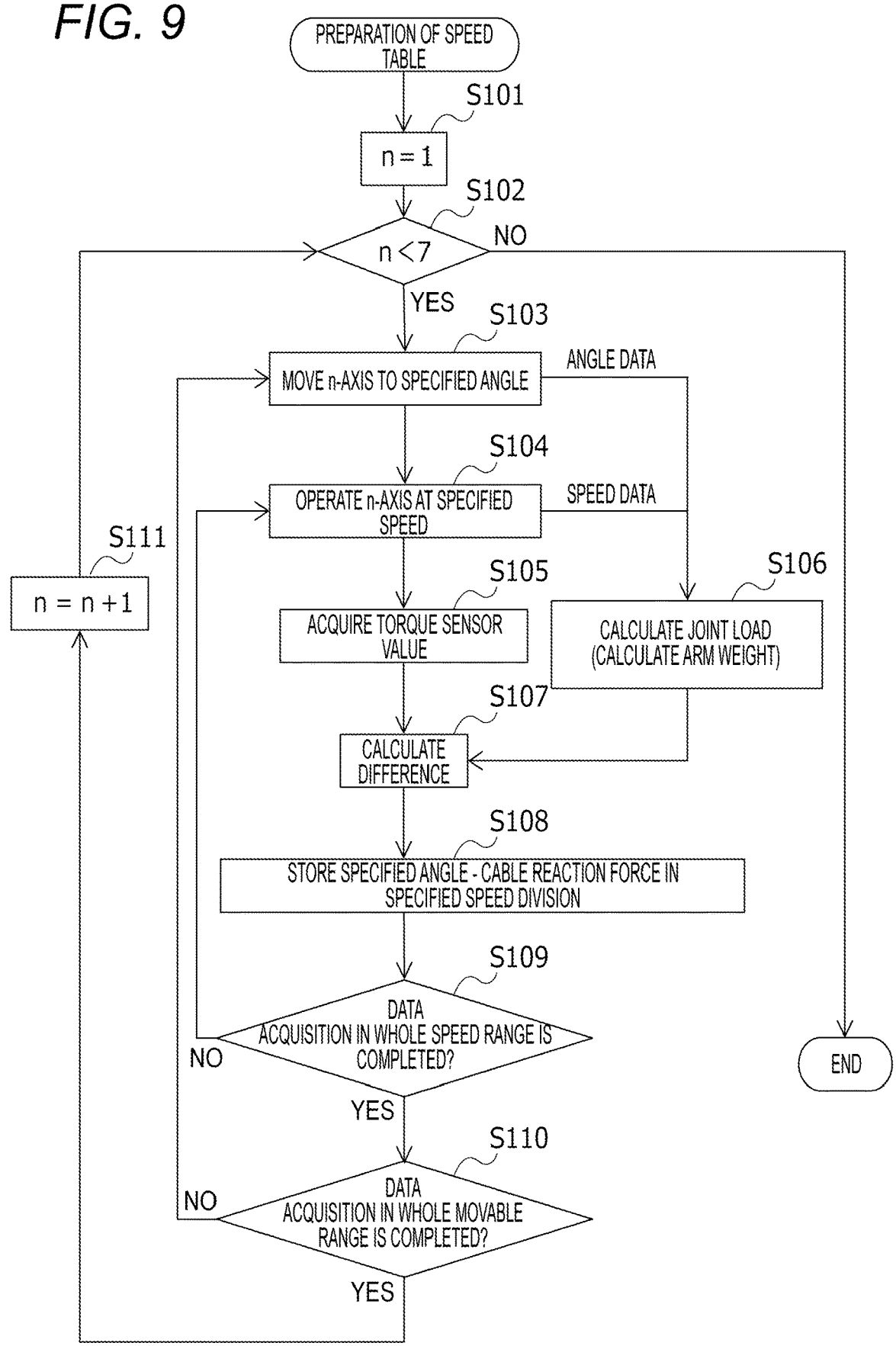
FIG. 9 is a flowchart showing preparation processing of a speed table.
Figure 10A:
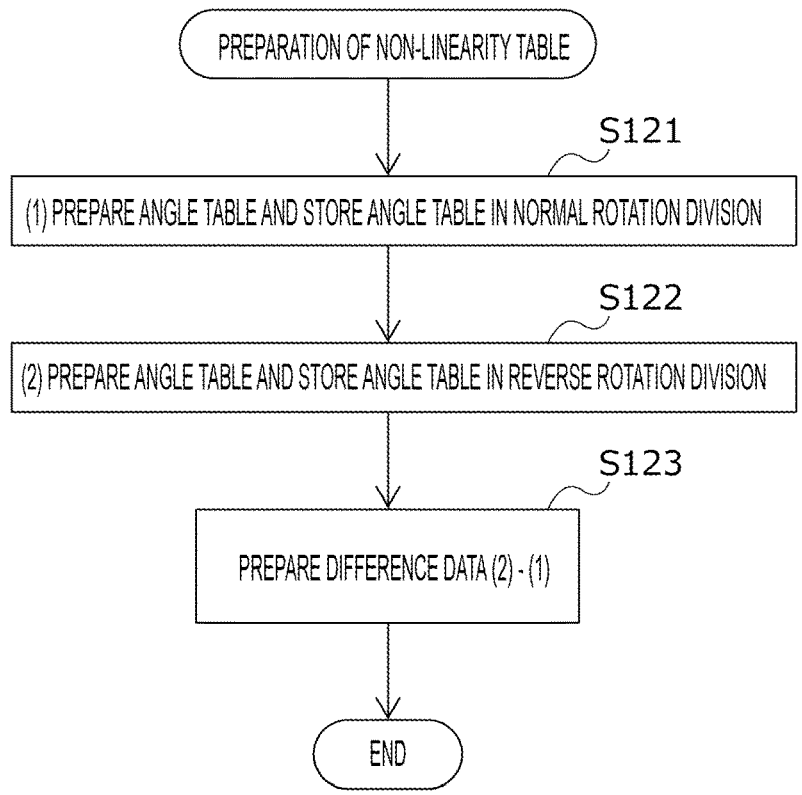
FIGS. 10A and 10B show preparation processing of a non-linearity table.
Figure 10B:
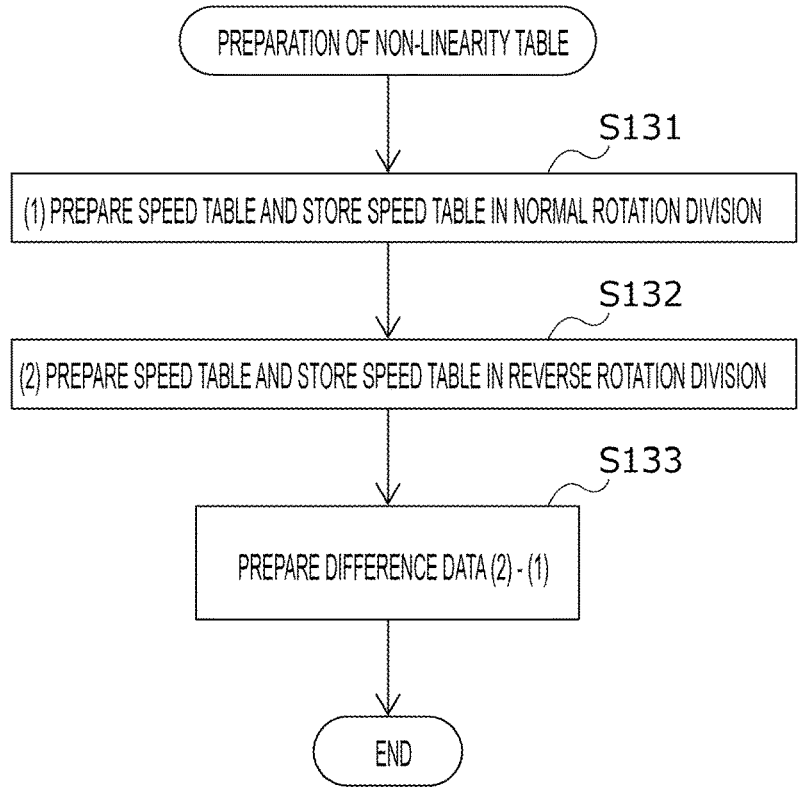

Table memory preparation processing performed by the control device 91, i.e., a preparation procedure of the reaction force table 900 will be described with reference to FIG. 8, FIG. 9, and FIGS. 10A and 10B. FIG. 8 shows a preparation procedure of the angle tables 911 to 961 (FIG. 2), FIG. 9 shows a preparation procedure of the speed tables 912 to 962 (FIG. 2), and FIGS. 10A and 10B show respective preparation procedures of two different types of the non-linearity tables 913 to 963 (FIG. 2). Those preparation procedures of the reaction force table 900 can be configured as (part of) a robot control program executable by the control device 91. In that case, the robot control program including the preparation procedures of the reaction force table 900 is stored on, for example, the ROM 602 as a control program executable by the control device 91 (specifically, a CPU 601 described below).

Note that each single table of the angle tables 911 to 961 is substantially equal to the table disclosed in Japanese Patent Laid-Open No. 2012-218104. However, preparation of the angle tables 911 to 961 is important to understand preparation of the speed tables 912 to 962 (FIG. 2) and the non-linearity tables 913 to 963 (FIG. 2) and therefore will be simply described.

Herein, the rotary joint 11 will be described as an example. Herein, tables corresponding to the rotary joint 11 are the angle table 911, the speed table 912, and the non-linearity table 913 in the reaction force table 900.

In order to prepare those tables, force (torque) acting on the rotary joint 11 is measured by the torque sensor 12 of the rotary joint 11 while a joint angle of the rotary joint 11 is being successively changed, and reaction force of the cable 80 is calculated. In that case, the rotary joint 11 is preferably operated in a state in which the end effector 70 and the links 10, 20, 30, 40, 50, and 60 of the robot arm 1 are not in contact with a peripheral apparatus or the like and do not receive any load. Based on a difference between a measurement value of the torque sensor 12 at this time and a torque estimation value, the reaction force thereof can be measured as cable reaction force in the rotary joint 11. However, regarding the torque estimation value used at this time, a torque generated in the joint is calculated by reverse kinematic operation on the basis of structure information of the robot apparatus, such as weight, dimension, a position of a center of gravity, and the like of each part of the robot arm 1.

For example, in a case where the angle table 911 is prepared for the rotary joint 11, a difference between a measurement value of the torque sensor obtained when the rotary joint is stopped at an arbitrary joint angle $\theta$ and a torque estimation value of the rotary joint 11 generated when the robot arm 1 adopts the posture is cable reaction force at the joint angle $\theta$. The angle table 911 can be prepared by repeating this operation while successively changing the joint angle $\theta$ (for example, every several degrees or several tens of degrees).

FIG. 8 shows a procedure in which the control device 91 (CPU 601) prepares the angle tables 911 to 961 of the six joints, i.e., the rotary joints 11 to 61. In step S91 in FIG. 8, a value of a counter n (or pointer) indexing 11 to 61 is initialized to "1" indicating the rotary joint 11. In step S92, whether or not the value of the counter n incremented in step S99 described below is smaller than 7 is determined. In a period in which the value of the counter n is smaller than 7, the successive processing has not proceeded to the processing of the rotary joint 61 yet, and therefore the steps in steps S93 to S99 are looped.

In step S93, the control device 91 controls the motor (92: FIG. 3) to control a joint angle of an n-axis to a specified angle at which reaction force is measured. Herein, the "n-axis" means each rotary joint, i.e., means the rotary joint 11 where n=1, the rotary joint 21 where n=2, the rotary joint 31 where n=3, . . . (the same applies hereinafter). Further, the processing in FIG. 8 is executed in the whole movable range of the joint, and, in a case where the movable range of the joint (n-axis) is, for example, 0° to 240°, the joint (n-axis) is first controlled at an end of the movable range, i.e., 0° or 240°. Then, the following processing is executed while the joint angle is being increased or decreased by a predetermined step angle of approximately several degrees to a dozen degrees.

In step S94, the control device 91 acquires a torque detection value from the torque sensor (12 in a case of the rotary joint 11: FIG. 3) of the joint. Further, in step S95, the control device 91 calculates a torque estimation value acting on the joint at the joint angle by reverse kinematic operation on the basis of geometry of the robot arm 1 and a weight, a position of a center of gravity, and the like of each part thereof (joint load calculation or arm weight calculation).

In step S96, the control device 91 acquires a difference between the torque detection value (actual value) obtained in step S94 and the torque estimation value obtained in step S95. The difference is a reaction force value (cable reaction force) generated by the wire rod (cable 80) at the joint angle (specified angle) of the joint as described above. In view of this, in step S97, table data in which the joint angle (specified angle) and the reaction force value of the cable 80 measured in this posture are associated with each other is stored in the angle table as a single record. At this time, the angle tables 911 to 961 serving as a storage destination storing the table data (record) can be determined by using, for example, the value of the counter n.

In step S98, the control device 91 determines whether or not data acquisition in the whole movable range of the joint has been terminated. Until the data acquisition in the whole movable range of the joint is terminated, the joint angle is increased (or decreased) by the above predetermined step angle, and then the processing returns to step S93 and the above processing is repeated. On the contrary, in a case where it is determined in step S98 that the data acquisition in the whole movable range of the joint has been terminated, the processing proceeds to step S99.

In step S99, in order to index the next joint, the control device 91 increments the counter n (n=n+1) and causes control to proceed to exit determination in step S92. In step S92 after the above processing is repeated, i.e., after the processing successively proceeds and the rotary joint 61 is processed, the value of the counter n reaches seven. In this case, all the angle tables 911 to 961 are prepared, and therefore the angle table preparation processing in FIG. 8 is terminated.

FIG. 9 shows speed table preparation processing, and the counter n is herein used to specify a rotary joint and a speed table corresponding to the joint in the same way as described above. Steps S101 and S102 are similar to S91 and S92 in FIG. 8 and correspond to initialization (n=1) of the counter and determination on whether or not all the joints have been processed (n<7). Note that, although, in this example, a six-axis articulated robot is considered as a robot arm that is generally and widely used and n<7 is set, the preparation processing of reaction force, speed, and non-linearity tables can also be used in a robot having different number of axes (three axes or seven axes). In that case, a threshold used in determination of n in this step only needs to be set to (the number of joints+1).

In step S103, the n-axis is controlled to a predetermined and specified joint angle (specified angle) and, when the joint is moved to a target specified angle in that case, a specified joint driving speed (specified speed) is used (step S104). The joint driving speed used at this time is, as a matter of course, V1, V2, V3(, . . .) in FIG. 2, for example. Note that steps S103 and S104 are separately written for convenience, and, when the joint is actually driven, the control device 91 sets parameters of the specified angle (target angle) and the driving speed and then starts actual drive processing.

Steps S105 and S106 are equal to steps S94 and S95 in FIG. 8, respectively. In step S105, a torque detection value is acquired from the torque sensor (12 in a case of the rotary joint 11: FIG. 3) of the joint. Further, in step S106, the control device 91 calculates a torque estimation value acting on the joint at the joint angle (or further the joint speed) (joint load calculation or arm weight calculation).

Then, in step S107, the control device 91 acquires a difference between the torque detection value (actual value) obtained in step S105 and the torque estimation value obtained in step S106. The difference is a reaction force value (cable reaction force) generated by the wire rod (cable 80) at the joint angle (specified angle) and the driving speed (dynamic drive control condition) of the joint as described above.

In view of this, in step S108, table data in which the joint angle (specified angle) and the reaction force value of the cable 80 measured in this posture are associated with each other is stored as a single record in a divided storage area corresponding to the driving speed (dynamic drive control condition) of the speed table. At this time, the speed tables 912 to 962 serving as a storage destination storing the table data (record) is determined by using, for example, the value of the counter n. Further, the divided storage area corresponding to the driving speed (dynamic drive control condition) and serving as the storage destination of the speed table is determined on the basis of the joint driving speed (V1, V2, V3, . . .) selected in step S104. In the example of FIG. 2, in a case where, for example, the driving speed is V1, the divided storage area (V1) is used.

In step S109, whether or not data acquisition has been completed in the whole speed range is determined. In the case of, for example, FIG. 2, the above processing is executed while the driving speed of the joint is being successively changed from V1 to V2 and then to V3. In this case, in a case where data acquisition using the driving speed of V3 is terminated, the processing proceeds to step S110, whereas, in a case where the driving speed of V3 has not been used yet, the driving speed condition is changed (for example, V1→V2) and the processing returns to step S104, and the processing similar to the above processing is executed.

In step S110, as well as in step S98, whether or not data acquisition in the whole movable range of the joint has been terminated is determined. Until the data acquisition in the whole movable range of the joint is terminated, the joint angle is increased (or decreased) by the above predetermined step angle, and then the processing returns to step S102 and the above processing is repeated. On the contrary, in a case where it is determined in step S110 that the data acquisition in the whole movable range of the joint has been terminated, the processing proceeds to step S111. In step S111, in order to index the next joint, the control device 91 increments the counter n (n=n+1) and causes the control to proceed to the exit determination in step S102. In step S102 after the above processing is repeated, i.e., after the processing successively proceeds and the rotary joint 61 is processed, the value of the counter n reaches seven. In this case, all the speed tables 912 to 962 are prepared, and therefore the speed table preparation processing in FIG. 9 is terminated.

Note that loop control of preparation of the speed tables 912 to 962 do not necessarily need to be the form in FIG. 9.

For example, equivalent speed tables 912 to 962 can also be prepared with a loop configuration in which the driving speed condition of the joint to the specified angle is selected in order from V1 to V2 and to V3, and the angle table preparation procedure in FIG. 8 is successively executed. In that case, the divided storage area corresponding to the driving speed (dynamic drive control condition) and serving as the storage destination of the speed table is determined on the basis of the joint driving speed (V1, V2, V3, . . .) selected in step S104.

FIGS. 10A and 10B correspond to respective preparation procedures of two different types of the non-linearity tables 913 to 963 (FIG. 2).

One of the preparation procedures can be implemented as in, for example, FIG. 10A. That is, angle table preparation processing similar to the processing in FIG. 8 is performed while joint driving is being performed in the normal rotation (D+) direction, and a record in which a joint angle and cable reaction force are associated with each other is acquired and is stored in the divided storage area (D+) (step S121:(1)). Then, angle table preparation processing similar to the processing in FIG. 8 is performed while joint driving is being performed in the reverse rotation (D−) direction, and a record in which a joint angle and cable reaction force are associated with each other is acquired and is stored in the divided storage area (D−) (step S122:(2)).

In this way, the record in which the joint angle and the cable reaction force are associated with each other can be stored in the divided storage area (D+, D−) divided for each of dynamically different drive control conditions of the joint, such as the normal rotation (D+) direction and the reverse rotation (D−) direction.

The non-linearity tables 913 to 963 prepared in steps S121 and S122 in FIG. 10A have the divided storage areas (D+, D−) corresponding to the respective driving directions, i.e., the normal rotation (D+) direction and the reverse rotation (D−) direction as shown in the right side of FIG. 2. The non-linearity tables 913 to 963 in FIG. 2 can be referred to by a method in which a reaction force value is read by using the joint angle (θ) as a key from the divided storage area (D+, D−) selected in accordance with the joint driving direction (D+/D−) at that time.

Note that processing for preparing a difference between data acquired in step S122(2) and data acquired in step S121(1), i.e., a difference between reaction force values stored in the divided storage areas D− and D+ is written in step S123. Although this data does not necessarily need to be prepared, it is considered that, for example, only such reaction force value difference data prepared as described above is stored instead of a partial table of the divided storage area D−. With this, a storage capacity necessary for the table memory may be reduced. In this case, when such a table is actually referred to, it is possible to obtain reaction force value data in the reverse rotation (D−) direction by referring to data at the joint angle in the divided storage area D+ and applying (for example, adding) reaction force value difference data related to the joint angle. At this time, reaction force value data in the normal rotation (D+) direction can be obtained by referring to data at the joint angle in the divided storage area D+.

Further, although an outline has already been described with reference to FIG. 2, the non-linearity tables 913 to 963 can also be prepared by preparing each speed table while performing joint driving in each driving direction, i.e., the normal rotation (D+) direction or the reverse rotation (D−) direction. FIG. 10B shows this processing.

That is, speed table preparation processing similar to the processing in FIG. 9 is performed while joint driving is being performed in the normal rotation (D+) direction, and a record in which a joint angle and cable reaction force are associated with each other is acquired and is stored in the divided storage area (D+) (step S131:(1)). Then, speed table preparation processing similar to the processing in FIG. 9 is performed while joint driving is being performed in the reverse rotation (D−) direction, and a record in which a joint angle and cable reaction force are associated with each other is acquired and is stored in the divided storage area (D−) (step S132:(2)). Note that it is needless to say that, in this case, the record in which the joint angle and the cable reaction force are associated with each other is stored in the divided storage area (D+ or D−) divided in accordance with the condition of the joint driving speed (dynamic drive control condition).

With this preparation processing, two speed tables having the record configuration shown in the center portion of FIG. 2 are prepared in the two divided storage areas (D+ and D−) corresponding to the normal rotation (D+) direction and the reverse rotation (D−) direction. Taking FIG. 2 as an example, a table configuration thereof is equal to a table configuration in which speed tables having divided storage areas based on the respective driving speeds V1, V2, V3(, . . .) are stored in each of the two divided storage areas (D+ and D−) corresponding to the normal rotation (D+) direction and the reverse rotation (D−) direction.

The non-linearity tables 913 to 963 prepared as in FIG. 10B have a divided storage area divided in accordance with the dynamic drive control conditions, i.e., the driving speed and the joint driving direction of the joint. Therefore, when the non-linearity tables 913 to 963 are referred to in joint operation to a certain joint angle, the control device 91 can select a corresponding divided storage area in accordance with the driving speed and the joint driving direction at that time. With this, the control device 91 can acquire a reaction force value in which both the dynamic drive control conditions, i.e., the driving speed and the joint driving direction are reflected. Then, it is possible to perform joint control (for example, torque servo control described below) on the basis of the acquired reaction force value in which both the dynamic drive control conditions, i.e., the driving speed and the joint driving direction are reflected.

Note that step S133 in FIG. 10B, as well as step S123 in FIG. 10A, is, for example, processing for preparing a difference-type cable reaction force value to be stored instead of a partial table of the divided storage area D− (or D+). Preparation of this difference-type cable reaction force value does not necessarily need to be executed in a case where it is not necessary to store difference data instead of the partial table of the divided storage area D− (or D+).

Note that, hereinabove, there has been described an example where the cable reaction force table is prepared by calculating reaction force of the cable on the basis of differences between actual measurement values of the torque sensors (12, 22, . . .) of the rotary joints 11 to 61 and torque estimation values of the rotary joints 11 to 61. Herein, in a case of a rotary joint in which a direction of a rotation axis can be matched with a direction of gravity, measurement may be performed by controlling a posture of the arm so as not to apply gravity to the target rotary joint when a cable reaction force table is prepared. In this case, a drive load of the rotary joint is only cable reaction force. Therefore, a detection value measured by a torque sensor can be stored in a table as it is as a cable reaction force value. However, such reaction force value measurement cannot be performed depending on geometry of the arm. However, regarding a joint in which such reaction force value measurement can be performed, it is possible to remove (or reduce) influence of an estimation error of a torque applied to the joint.

Further, in preparation of the angle, speed, and non-linearity tables in FIG. 8 to FIGS. 10A and 10B, the reaction force table 900 may be prepared by, before the cable is provided in the robot arm 1, measuring a reaction force value with the use of a dedicated measurement apparatus for measuring cable reaction force.

However, a wide variety of cables (80) may be actually provided in accordance with a user installation environment, and there may be various individual differences. Therefore, in a case where the dedicated measurement apparatus is used as described above, tables suitable for use states of all users cannot be prepared at the time of manufacturing of the robot arm 1, and therefore estimation precision of reaction force of the cable may be reduced and precision of control may be reduced.

On the contrary, the reaction force table 900 is prepared by the same robot apparatus as a robot apparatus that uses the table, and therefore it is possible to improve estimation precision of cable reaction force by referring to the reaction force table 900 and precision of joint control based thereon. The preparation processing of the reaction force table 900 shown in FIG. 8 to FIGS. 10A and 10B only needs to be implemented at least once at an appropriate timing after manufacturing in an environment in which a user uses the robot apparatus.

For example, preparation processing of a new reaction force table 900 (or data update processing thereof) can be implemented at a timing of shipment, a timing of installation in a user environment, a timing of initialization caused by turning on a power supply, a timing of periodic inspection, or other timings.

(Control Device)

FIG. 3 shows a configuration example of the control system of the robot apparatus in this example. In FIG. 3, the control system 97 of the robot apparatus includes the control device 91 (FIG. 1A) and the command device 94. The control device 91 controls operation of the robot arm 1 by controlling the following parts shown in a right-side portion of FIG. 3.

In FIG. 3, the motors driving the above rotary joints 11, 21, 31, 41, 51, and 61 are shown as a single block of the motor 92. The motor 92 is, for example, a servo motor, and an encoder 95 for detecting an angle of rotation in order to perform position control of an angle of rotation of a joint is (individually) provided together with the motor 92 of each rotary joint. More specifically, the encoder 95 is provided on an output shaft of the motor 92, an output shaft of a reduction gear for reducing a speed of rotation output, or both the output shafts thereof.

Further, for example, in order to control rotary drive torques (for example, torque servo) of the rotary joints 11, 21, 31, 41, 51, and 61, the above torque sensors 12, 22, 32, 42, 52, and 62 are provided in part of the drive systems (not shown) of the respective rotary joints. Those torque sensors 12, 22, 32, 42, 52, and 62 are also shown as a single block in FIG. 3.

Furthermore, the reaction force table 900 for the rotary joints 11, 21, 31, 41, 51, and 61 is stored on the memory 91*a* of the control device 91. A storage area of the memory 91*a* can be configured by the ROM 602, the RAM 603 (FIG. 7), and the like described below. Alternatively, the reaction force table 900 may be stored in the form of, for example, a data file by providing an external storage device (not shown) such as an HDD (SSD) and various flash memories.

The control device 91 performs control to detect an angle of rotation (posture) of each joint with the use of the encoder 95 of each joint and cause the whole robot arm 1 to adopt a desired position posture so that, for example, the end effector 70 adopts a predetermined position posture.

Further, the control device 91 controls drive energy of the motor 92 of each joint (for example, PWM control) on the basis of a drive torque of each joint detected by each of the above torque sensors 12 to 62 and therefore can perform control so that the drive torque of each joint has a desired value. With this, for example, it is possible to perform control so that, when a workpiece is operated by the end effector 70, force based on a physical property (for example, rigidity or intensity) of the workpiece is not applied to the workpiece serving as a target object.

If a large error occurs in such torque control because of cable reaction force, it is difficult to use the robot apparatus particularly for a case where operation force to the workpiece serving as the target object is limited to a small range. However, in this example, there is used a cable reaction force table in which not only a static drive control condition such as a joint angle but also a dynamic drive control condition such as a non-linear (hysteresis) characteristic related to a driving speed and a driving direction is considered as a drive control condition of the rotary joints. Therefore, it is possible to correct cable reaction force in accordance with a real joint drive condition, and thus it is possible to control each joint on the basis of accurate torque control. Therefore, it is possible to apply the robot apparatus also to the case where operation force to the workpiece serving as the target object is limited to a small range, and thus it is possible to perform highly reliable target object operation without damaging the workpiece.

Herein, both position (posture) control using the encoder 95 and torque control (torque servo) using the torque sensors 12, 22, 32, 42, 52, and 62 are publicly-known control. For example, regarding a specified rotary joint, the control device 91 controls the motor 92 by using an angle of rotation or a target value of a joint drive torque programmed in advance (or specified by the command device 94) and actual measurement values of the encoder 95 and the torque sensors 12 to 62. In that case, the control device 91 realizes intended robot operation by performing control so that the target value is matched with the actual measurement values.

In this example, furthermore, it is possible to reflect cable reaction force shown in the above reaction force table 900 in the torque control (torque servo) using the torque sensors 12, 22, 32, 42, 52, and 62.

As described above, the reaction force table 900 particularly shows cable reaction force acting as disturbance around the same rotation axis as that of the torque sensor of each joint and movement of the rotary joint. Meanwhile, each of the torque sensors 12, 22, 32, 42, 52, and 62 is provided in part of the drive system of each rotary joint and therefore measures resultant force of the drive torque of the motor 92 and the above cable reaction force because of a mechanism thereof. Thus, for example, it is possible to correct torque detection values obtained by using the torque sensors 12, 22, 32, 42, 52, and 62 with the use of the cable reaction force shown in the reaction force table 900 as described below. With this, it is possible to remove a disturbance component of the cable reaction force and implement accurate torque control (torque servo) regarding each rotary joint.

Note that, more specifically, as shown in, for example, FIG. 7, the control device 91 can be mainly configured by the CPU 601 including a general microprocessor and the like. In FIG. 7, the control device 91 can include, for example, the CPU 601, the ROM 602 for storing a robot control program for controlling each part, the RAM 603 for temporarily storing data, and the interface circuits 604 and 605.

The ROM 602 corresponds to a recording medium readable by a computer (CPU 601) and storing a robot control program containing torque control described below. The CPU 601 executes robot control containing torque control described below by executing, for example, the robot control program stored on the ROM 602.

Note that, for example, part of the ROM 602 can be configured by a rewritable non-volatile area. In that case, it is possible to newly install a robot control program acquired via a computer readable recording medium (not shown) such as a flash memory or an optical disk, a network, or the like in the above rewritable non-volatile area. Further, the robot control program stored in the above rewritable non-volatile area can also be updated by using data acquired via the above computer readable recording medium, the network, or the like.

A storage area of the memory 91a (FIG. 3) storing the above reaction force table 900 can be configured by the ROM 602, the RAM 603 (FIG. 7), and the like. The interface circuit 604 can be used to receive/output data from/to, for example, the command device 94. Further, the interface circuit 605 can be used to receive/output data from/to, for example, the motor 92, the encoder 95, and the torque sensors 12, 22, 32, 42, 52, and 62. Further, in a case where the reaction force table 900 is stored on an external storage device (not shown) such as an HDD (SSD) and various flash memories, the interface circuit 605 can be used to access the reaction force table 900 in the external storage device.

The command device 94 for giving an operation command of the robot arm 1 includes a storage device (not shown) (for example, RAM, ROM, or external storage device). Robot control information on the robot arm 1, which is necessary to perform assembly of products and the like, is recorded on this recording device. This robot control information is written in the format of, for example, a plurality of pieces of teaching point data or a robot control program. Further, the storage device of the robot control information can also be configured by the RAM 603 or the ROM 602 in the control device 91 or an external storage device (not shown) (for example, HDD or SSD) instead of the storage device in the command device 94.

An operator operates the command device 94 and specifies execution (reproduction) of the above robot control information prepared in advance, thereby causing the robot arm 1 to perform operation programmed in advance. Further, in a case where the command device 94 is a teaching device such as a teaching pendant, it is possible to cause the robot arm 1 to interactively perform arbitrary operation by operating the operation key of the command device 94 for giving a command of operation of a joint by a jog operation method or the like. In that case, operation that has been successively executed can also be stored on the above storage device as the robot control information. The teaching operation of the robot apparatus and the storage method of the robot control information are publicly-known techniques, and therefore more detailed description thereof is omitted herein.

In this example, the control device 91 can estimate cable reaction force acting as a measurement error (disturbance) of the torque sensors 12 to 62 on the basis of the reaction force table 900. In addition, for example, it is possible to perform correction control in which cable reaction force is subtracted from a value shown in the cable reaction force table (FIG. 6 described below). By performing correction calculation in which a component of the cable reaction force is subtracted from output values of the torque sensors 12 to 62 as described above, each motor 92 can calculate more accurately an actual value of a torque actually applied to a hand-side link of the joint via the reduction gear (not shown). In addition, it is possible to execute torque (servo) control of the joints of the robot arm 1 more accurately by performing control so that the torque value obtained by removing the cable reaction force and a target value of the torque generated in the joint, the target value being transmitted from the command device 94, are matched with each other. Note that an actual example of robot control executable by the CPU 601 of the control device 91 will be described in Example 2 described below.

As described above, regarding the rotary joints 11, 21, 31, 41, 51, and 61, the reaction force table 900 is provided in this example. In addition, it is possible to implement correction calculation in which output of the torque sensors 12 to 62 for measuring the drive torques of the respective joints is corrected by using the reaction force table 900.

Note that, in order to improve torque controllability in the torque control of the rotary joints of the robot apparatus, torque control in which the torque sensors are placed in the respective joints to detect drive torque values and the drive torque values are fed back to motor control of the joints is performed in some cases. In such torque control (servo), ideally, measurement values of the torque sensors 12 to 62 need to be values obtained by measuring only torques that the joints apply to the links. However, when the cable 80 is provided along the inside and outside of the robot arm 1, cable reaction force generated due to deformation of the cable 80 caused by robot operation may cause an error in the measurement values of the torque sensors 12 to 62.

On the contrary, in this example, it is possible to estimate reaction force generated due to deformation of the cable with the use of the cable reaction force table and correct torque values measured by the torque sensors, thereby feeding back a value having a small error. Therefore, it is possible to perform torque control of the joints in a range of minute force in which torque control could not have been conventionally performed due to errors of the torque sensors, and thus it is possible to assemble a tiny component having a minute weight in particular by performing force (torque) control.

With this, manufacturing and assembly of a tiny component, which could not have been conventionally performed by a robot of this kind, can be performed by using a general articulated robot for force (torque) control, without using a conventional dedicated apparatus that is specially designed and manufactured.

Further, torque values detected by the torque sensors provided in the rotary joints are used to suppress vibration of the robot arm in some cases. In particular, in the articulated robot arm, vibration of the end effector 70 generated when the end effector 70 is stopped from a moving state is problematic in some cases. For example, in a state in which a position of the tip end of the robot arm is overshot and the end effector interferes with or is brought into contact with another member, a waiting time until vibration is stopped is a bottleneck in reduction in an assembly time in some cases.

In the above robot arm 1, the torque sensors 12, 22, 32, 42, 52, and 62 provided in the respective joints can be used to solve this vibration problem. For example, it is possible to suppress vibration of the robot arm 1 by measuring torques generated in the joints with the use of the torque sensors 12, 22, 32, 42, 52, and 62 and performing control so that the motor 92 for driving the joints is driven to cancel the torques.

In addition, according to this example, it is possible to remove cable reaction force generated in the joints as disturbance on the basis of output values of the torque sensors 12, 22, 32, 42, 52, and 62 by using the reaction force table 900. Therefore, according to this example, it is possible to extremely precisely measure actual torque values generated in the links supported by the joints, and, by feeding back the actual torque values to vibration suppression of the robot, improvement in this vibration suppressing performance can also be expected.

EXAMPLE 2

In this example, some examples of a robot control procedure (robot control program) executable in the CPU 601 of the above control device 91 will be exemplified. FIG. 5 and FIG. 6 show flows of the robot control procedure (robot control program) executable in the CPU 601 of the control device 91.

The control example in FIG. 5 is an example where a command value from the command device 94 for driving a rotary joint is corrected in accordance with cable reaction force shown in the reaction force table 900. Further, the control example in FIG. 6 is an example where torque control is performed by correcting output values of the torque sensors 12, 22, 32, 42, 52, and 62 of the respective rotary joints in accordance with the cable reaction force shown in the reaction force table 900. In order to facilitate understanding, control shown in FIG. 5 and FIG. 6 is simplified as control related to a single specified rotary joint. The control shown in FIG. 5 and FIG. 6 can be stored on, for example, the ROM 602 as part of the robot program executed by the CPU 601.

The above reaction force table 900 (FIG. 2) is used in both the control in FIG. 5 and the control in FIG. 6. However, in this example, control in which each dynamic drive control condition is reflected is performed and at least one set of the speed tables 912 to 962 and the non-linearity tables 913 to 963 in FIG. 2 is prepared as the reaction force table 900. Although drive control of the joints can be performed by using only the angle tables 911 to 961 in FIG. 2, the problems that have been described regarding Japanese Patent Laid-Open No. 2012-218104 may not be solved in that case.

The command device 94 can transmit command values related to positions or postures of the rotary joints 11, 21, 31, 41, 51, and 61 of the robot arm 1 to the control device 91. Herein, the control in FIG. 5 is shown as control related to a single joint, and, when the control device 91 receives a command value from the command device 94, the control device 91 transmits a command value for performing drive control thereof in response to the received command value to the motor 92 of the joint.

In FIG. 5, when the CPU 601 receives a command value related to drive control of a rotary joint related to the control in FIG. 5 from the command device 94 in step S74, the CPU 601 determines a rotation direction of the rotary joint (any of the above rotary joints) related to the received command value in step S75. As to a command value of this kind for use in the control of the rotary joint, in particular, a command value regarding an angle of rotation, for example, a command value regarding a certain specified rotation direction of the rotary joint is indicated by a positive (+) sign and a command value regarding an opposite rotation direction thereof is indicated by a negative (−) sign. In view of this, when, for example, a sign of the command value received in step S74 is interpreted, it is possible to determine whether the rotation direction of the rotary joint corresponding to the command value is positive (+) or negative (−) (or positive direction or opposite direction).

Simultaneously, in step S71, the CPU 601 acquires a measurement value of cable reaction force to be output from the reaction force table 900 provided regarding the rotary joint related to the control in FIG. 5 (reaction force value acquisition). Furthermore, in step S72, a direction of a load of the cable 80 supported by the joint is determined on the basis of a value (for example, sign thereof) shown in the reaction force table 900. Input from/output to the reaction force table 900 and determination on a load direction in steps S71 and S72 and input from/output to the command device 94 and determination on an operation direction in steps S74 and S75 can be executed in parallel by using, for example, a hardware interrupt.

Herein, in a case of the reaction force table 900 in FIG. 2, a region divided in accordance with each dynamic drive control condition of the speed tables 912 to 962 or the non-linearity tables 913 to 963 is referred to in accordance with the dynamic drive control condition (for example, driving speed or driving direction) of each joint. Specifically, each of the tables is referred to by using a joint angle as a key, and, in that case, a region divided in accordance with the driving speed or the driving direction is referred to in accordance with the dynamic drive control condition (for example, driving speed or driving direction) of each joint. With this, it is possible to accurately estimate cable reaction force applied to the rotary joint 21 due to deformation of the cable 80 in accordance with the dynamic drive control condition of each joint.

As a matter of course, the cable reaction force (load), as well as the rotation direction of the joint, has a positive (+) or negative (−) rotation direction (or positive direction or opposite direction). In step S72, the CPU 601 detects the rotation direction of the joint by using the reaction force table 900.

In step S76, there is determined whether the operation direction of the rotary joint related to the command value of the command device 94 and the direction of the cable reaction force specified by using the reaction force table 900 regarding the joint, which have been specified in steps S75 and S72, are matched or are not matched.

Then, in a case where both the directions are matched (S77), the cable reaction force assists drive force of the motor (92) for driving the joint. In this case, the processing proceeds to step S79, and the following correction is performed: a command value to be transmitted to the motor (92) of the joint in response to a command of the command device 94 is reduced by an amount corresponding to a magnitude of the cable reaction force.

On the contrary, in a case where both the directions are not matched in step S76 (S78), the cable reaction force acts in a direction in which the cable reaction force resists the drive force of the motor (92) for driving the joint. In this case, the processing proceeds to step S80, and the following correction is performed: a command value to be transmitted to the motor (92) of the joint in response to a command of the command device 94 is increased by an amount corresponding to a magnitude of the cable reaction force.

Meanwhile, FIG. 6 shows a control example performed in a case where cable reaction force estimated on the basis of the reaction force table 900 is caused to act on torque control using output values of the torque sensors 12, 22, 32, 42, 52, and 62. In the control in FIG. 6, a command value of a rotary joint related to the control procedure shown in FIG. 6 is determined on the basis of the robot control program (not shown) prepared in advance, the command value is transmitted to the motor (92), and processing (not shown) for driving the joint is executed in parallel. Note that, also in the control in FIG. 6, at least one set of the speed tables 912 to 962 and the non-linearity tables 913 to 963 is provided as the reaction force table 900.

In step S83 in FIG. 6, the CPU 601 acquires measurement data of a torque sensor (12, 22, 32, 42, 52, 62) provided in a specified rotary joint related to the control in FIG. 6 and, in step S84, determines a rotation direction of the joint. In the determination on the rotation direction in step S84, (a sign of) a command value of the motor 92 of the joint separately generated by the above control may be used, or a sign of an output value of the torque sensor related to the joint may be used.

Meanwhile, in step S81, a cable reaction force value to be output is acquired from the reaction force table 900 provided regarding the rotary joint related to the control in FIG. 6. At this time, a region divided in accordance with each dynamic drive control condition of the speed tables 912 to 962 or the non-linearity tables 913 to 963 of the reaction force table 900 is referred to in accordance with the dynamic drive control condition (for example, driving speed or driving direction) of each joint, which is similar to the step in FIG. 5. Specifically, each of the tables is referred to by using a joint angle as a key, and, in that case, a region divided in accordance with the driving speed or the driving direction is referred to in accordance with the dynamic drive control condition (for example, driving speed or driving direction) of each joint. With this, it is possible to accurately estimate cable reaction force applied to the rotary joint 21 due to deformation of the cable 80 in accordance with the dynamic drive control condition of each joint.

In step S82, a direction of a load of the cable 80 supported by the joint is determined on the basis of, for example, a sign of the reaction force value output from the reaction force table 900. Input from/output to the cable reaction force table and determination on a load direction in steps S81 and S82 and input from/output to the command device 94 and determination on an operation direction in steps S83 and S84 can be executed in parallel by using, for example, a hardware interrupt.

In step S86, as well as in step S76 in FIG. 5, there is determined whether the operation direction of the rotary joint and the direction of the cable reaction force shown in the reaction force table 900 regarding the joint, which have been specified in steps S84 and S82, are matched or are not matched.

Then, in a case where both the directions are matched (S87), the torque sensor related to the joint outputs a value in which a value estimated by using the cable reaction force table related to the joint is added. That is, a joint drive torque actually generated by the motor (92) of the joint is supposed to be smaller than the value detected by the torque sensor. In this case, the processing proceeds to step S89, and, in order to calculate a true (actual) joint drive torque, the following correction is performed: the value of the cable reaction force estimated by using the cable reaction force table related to the joint is subtracted from the output value of the torque sensor related to the joint.

Meanwhile, in a case where both the directions are not matched in step S86 (S88), the torque sensor related to the joint outputs a value in which the cable reaction force estimated by using the cable reaction force table related to the joint is subtracted. That is, a joint drive torque actually generated by the motor (92) of the joint is supposed to be larger than the value detected by the torque sensor. In this case, the processing proceeds to step S90, and, in order to calculate a true (actual) joint drive torque, the following correction is performed: the value of the cable reaction force estimated by using the reaction force table 900 related to the joint is added to the output value of the torque sensor related to the joint.

Then, in step S91, a command value of the joint drive torque to be applied to the motor (92) of the joint is calculated by using the true (actual) joint drive torque value in which the cable reaction force has been corrected in step S89 or S90. It is considered that an object of the torque control calculation in step S91 is to, for example, limit a torque in a case where a tiny component (workpiece) or the like is treated by the end effector 70 as described above. In this case, for example, the command value is calculated so that the drive torque of the joint does not exceed a predetermined value. In the torque control calculation in step S91, it is also possible to perform command value calculation for suppressing vibration of the robot arm 1 as described above.

In step S92, the command value obtained as a result of the torque control calculation in step S91 is transmitted to the motor (92) of the joint.

Hereinabove, as described above with reference to FIG. 5 and FIG. 6, it is possible to perform drive control of the motor (92) serving as a drive actuator for driving the joint on the basis of the reaction force value of the cable (80) estimated by using the reaction force table (900) provided regarding the rotary joint (11 to 61). The reaction force table (900) is referred to in accordance with a dynamic drive control condition (for example, driving speed or driving direction) of each joint. That is, a region divided in accordance with the driving speed or the driving direction in the speed tables 912 to 962 or the non-linearity tables 913 to 963 of the reaction force table 900 is referred to in accordance with the dynamic drive control condition (for example, driving speed or driving direction) of each joint.

With this, in both the control in FIG. 5 and the control in FIG. 6, it is possible to acquire an accurate reaction force value of the cable in accordance with the dynamic drive control condition (for example, driving speed or driving direction) of each joint.

In particular, in the control in FIG. 5, it is possible to correct a command value of the motor (92) serving as the drive actuator of the joint in accordance with a relationship between the direction of the cable reaction force from the reaction force table 900 and the operation direction of the joint. For example, it is possible to correct the command value of the motor (92) serving as the drive actuator of the joint in accordance with whether the cable reaction force assists joint operation of the joint or resists the joint operation.

Further, in the control in FIG. 6, it is possible to detect a true (actual) rotary drive torque value by removing a component of the cable reaction force of the cable (80) contained as disturbance in a rotary drive torque value detected by the torque sensor (12 to 62) provided regarding the rotary joint (11 to 61). Then, it is possible to accurately correct the command value (target value) of the motor (92) serving as the drive actuator of the joint with the use of the true (actual) rotary drive torque value in which the component of the cable reaction force that has been accurately calculated by referring to the table is removed. Note that the target value (command value) of the torque control of this kind is determined by the control device 91 (CPU 601) in accordance with an object such as limitation of force (torque) or suppression of vibration.

As described above, in this embodiment, regarding the cable (80) serving as a wire rod for communicating a drive signal to at least a drive actuator of a rotary joint of the robot arm (1), the reaction force table (900) for estimating cable reaction force caused by deformation of the cable (80) is provided. Therefore, the cable reaction force estimated by using the reaction force table 900 can be accurately fed back to the drive control of the motor (92) serving as the drive actuator of the rotary joint, and therefore it is possible to perform precise robot control containing position control and torque control. That is, reaction force of the cable (80) serving as a wire rod used for communicating a drive signal to the joint (or end effector) of the robot apparatus can be estimated by using the reaction force table 900, and therefore it is possible to perform precise robot control with the use of the estimation value.

Note that, in a case where rotary drive torques measured in the torque sensors 12 to 62 provided regarding the rotary joints 11 to 61 are fed back to an operation command value to the motor 92, it is also considered that the rotary drive torques are fed back not only to the above force (torque) control but also to position control. For example, it is considered that a positional shift of the end effector 70 of the robot arm 1 is detected on the basis of the rotary drive torques measured by the torque sensors 12 to 62 and the rotary drive torques are fed back to a driving amount (position control command) of the motor 92 based on the positional shift. By feeding back the rotary drive torques to the position control of the joints as described above, it is possible to increase position precision of the end effector 70. Note that, in a case where the rotary drive torques measured by the torque sensors 12 to 62 are fed back to a position control command to the motor 92, it is possible to perform control to adjust a position (for example, angle of rotation) given as an operation command value or perform control to change a gain of a position command.

In each example described above, there is used a table memory in which a reaction force value generated by the wire rod (cable 80) is stored in a divided storage area divided for each dynamic drive control condition such as a driving speed or an operation direction of the joint at each joint angle.

Herein, it is possible to consider that a relationship between a joint angle and a reaction force value of the wire rod is a static elastic relationship, whereas it is possible to consider that, regarding the dynamic drive control condition, a relationship between the driving speed of the joint and the reaction force value is a viscous relationship (viscosity relationship). Further, it is possible to consider that, as another dynamic drive control condition, a relationship between the operation direction of the joint and the reaction force value is a non-linear relationship (non-linearity relationship) on which hysteresis acts.

In each example described above, estimation is performed by preparing a table in terms of not only the elastic relationship but also viscosity and non-linearity. Specifically, the relationship between the joint angle and the reaction force value of the wire rod, which is an elastic relationship, is stored in the divided storage area of the table memory divided for each dynamic drive control condition such as the driving speed and the operation direction of the joint. In addition, in a case where the reaction force value of the wire rod (cable 80) at the time of joint driving is acquired (estimated) by using the table memory, the divided storage area corresponding to the dynamic drive control conditions such as the driving speed and the operation direction of the joint is referred to. With this, it is possible to acquire (estimate) a more accurate reaction force value of the wire rod (cable 80) in which not only the elastic relationship between the joint angle and the wire rod but also the dynamic drive control conditions such as the driving speed and the operation direction of the joint are reflected.

The acquired (estimated) reaction force value of the wire rod (cable 80) can be used for, for example, torque servo control in which a torque acting on the joint is measured by using the torque sensor to control the drive actuator for driving the joint. According to the table memory in each example described above, it is possible to acquire (estimate) a more accurate reaction force value of the wire rod (cable 80) in which the dynamic drive control conditions such as the driving speed and the operation direction of the joint are reflected. Therefore, precision of the torque servo control of the joints is improved, and therefore it is possible to control the robot apparatus with higher precision. With this, in a case where torque (force) control of force applied to a workpiece or a link is performed by using the torque sensors, it is possible to perform calculation to remove reaction force of the wire rods acting as disturbance from output of the torque sensors, and therefore it is possible to perform accurate torque (force) control on the basis of accurate torque detection.

Therefore, in, for example, a robot apparatus having a general configuration, it is possible to accurately perform force control of joints, and thus it is possible to realize manufacturing of articles by assembling and processing a component having a small weight of approximately several grams (for example, equal to or less than ten grams) which needs delicate force control. With this, in a production line in which a component having a minute weight is assembled, a dedicated apparatus, manual operation by human power, or the like is unnecessary and a robot apparatus having a general configuration can be used. Therefore, it is possible to cut designing, a production cost, and a production period of a dedicated apparatus that has been conventionally necessary. Further, it is possible to reduce a startup cost of the production line in which a tiny component is assembled.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-054707, filed Mar. 18, 2016, which is hereby incorporated by reference herein in its entirety.

What is claimed is:

1. A robot apparatus comprising:
A rotary joint configured for rotation in at least a first direction and a second direction opposite the first direction;
a driving source configured to drive the rotary joint;
a sensor configured to detect a torque applied to the rotary joint;
a cable member traversing the rotary joint, and configured to generate a first force to be applied to the rotary joint due to deformation of the cable member when the rotary joint is rotated in the first direction and a second force to be applied to the rotary joint due to deformation of the cable member when the rotary joint is rotated in the second direction;
a memory configured to store a first control value based on the first force, and a second control value based on the second force, with respect to a third position of the rotary joint through which the rotary joint passes when the rotary joint is rotated from a first position to a second position in the first direction and when the rotary joint is rotated from the second position to the first position in the second direction; and
a control device configured to control a rotary drive torque of the driving source, using a detection value of the sensor and the first control value or the second control value stored in the memory,
wherein the control device is configured to control the rotary drive torque of the driving source, using the detection value of the sensor and the first control value, when the rotary joint is located at the third position while the rotary joint is rotated in the first direction, and to control the rotary drive torque of the driving source, using the detection value of the sensor and the second control value, when the rotary joint is located at the third position while the rotary joint is rotated in the second direction.

2. The robot apparatus according to claim 1, wherein the control device drives the rotary joint based on a drive control condition, and obtains the first control value and the second control value based on a difference between an output value of the torque sensor when the control device drives the rotary joint and a torque value of the rotary joint estimated based on information about a structure of the rotary joint.

3. The robot apparatus according to claim 1, wherein the memory stores a viscosity relationship between a rotation angle of the rotary joint and the first control value and the second control value at the rotation angle for each driving speed of the rotary joint.

4. The robot apparatus of claim 1, further comprising a first arm and a second arm, wherein the first arm is in communication with the second arm through the rotary joint.

5. The robot apparatus of claim 1, further comprising a controller for controlling movement of the rotary joint.

6. The robot apparatus of claim 1, wherein the cable member is resilient and may contribute a resistance force when the rotary joint is rotated.

7. The robot apparatus of claim 1, wherein the first control value and second control value are not the same.

8. The robot apparatus according to claim 1, wherein: an end effector is attachable to a robot arm, and a drive signal of the end effector is communicated to the end effector via the cable member.

9. A computer readable recording medium storing a robot control program for causing a robot apparatus to execute robot control, the robot apparatus comprising:
a rotary joint configured for rotation movement in at least a first direction and a second direction opposite the first direction;
a driving source configured to drive the rotary joint;
a sensor configured to detect a torque applied to the rotary joint;
a cable member traversing the rotary joint, and configured to generate a first force to be applied to the rotary joint due to deformation of the cable member when the rotary joint is rotated in the first direction and a second force to be applied to the rotary joint due to deformation of the cable member when the rotary joint is rotated in the second direction; a memory configured to store a first control value based on the first force, and a second control value based on the second force, with respect to a third position of the rotary joint through which the rotary joint passes when the rotary joint is rotated from a first position to a second position in the first direction and when the rotary joint is rotated from the second position to the first position in the second direction; and
a control device configured to control a rotary drive torque of the driving source, using a detection value of the sensor and the first control value or the second control value stored in the memory,
wherein the control device is configured to control the rotary drive torque of the driving source, using the detection value of the sensor and the first control value, when the rotary joint is located at the third position while the rotary joint is rotated in the first direction, and to control the rotary drive torque of the driving source, using the detection value of the sensor and the second control value, when the rotary joint is located at the third position while the rotary joint is rotated in the second direction.

10. A control method of a robot apparatus including:
a rotary joint configured for rotation movement in at least a first direction and a second direction opposite the first direction;
a driving source configured to drive the rotary joint;
a sensor configured to detect a torque applied to the rotary joint;
a cable member traversing the rotary joint, and configured to generate a first force to be applied to the rotary joint due to deformation of the cable member when the rotary joint is rotated in the first direction and a second force to be applied to the rotary joint due to deformation of the cable member when the rotary joint is rotated in the second direction; a memory configured to store a first control value based on the first force, and a second control value based on the second force, with respect to a third position of the rotary joint through which the rotary joint passes when the rotary joint is rotated from a first position to a second position in the first direction and when the rotary joint is rotated from the second position to the first position in the second direction;

a control device configured to control a rotary drive torque of the driving source, using a detection value of the sensor and the first control value or the second control value stored in the memory, wherein the control device is configured to control the rotary drive torque of the driving source, using the detection value of the sensor and the first control value, when the rotary joint is located at the third position while the rotary joint is rotated in the first direction, and to control the rotary drive torque of the driving source, using the detection value of the sensor and the second control value, when the rotary joint is located at the third position while the rotary joint is rotated in the second direction.

11. A manufacturing method of an article, comprising:

assembling a component using a robot apparatus, the robot apparatus including:

a joint configured for rotation in at least a first direction and a second direction opposite the first direction;

a driving source configured to drive the rotary joint;

a sensor configured to detect a torque applied to the rotary joint;

a cable member traversing the rotary joint, and configured to generate a first force to be applied to the rotary joint due to deformation of the cable member when the rotary joint is rotated in the first direction and a second force to be applied to the rotary joint due to deformation of the cable member when the rotary joint is rotated in the second direction;

a memory configured to store a first control value based on the first force, and a second control value based on the second force, with respect to a third position of the rotary joint through which the rotary joint passes when the rotary joint is rotated from a first position to a second position in the first direction and when the rotary joint is rotated from the second position to the first position in the second direction;

a control device configured to control a rotary drive torque of the driving source, using a detection value of the sensor and the first control value or the second control value stored in the memory, wherein the control device is configured to control the rotary drive torque of the driving source, using the detection value of the sensor and the first control value, when the rotary joint is located at the third position while the rotary joint is rotated in the first direction, and to control the rotary drive torque of the driving source, using the detection value of the sensor and the second control value, when the rotary joint is located at the third position while the rotary joint is rotated in the second direction.

* * * * *